(12) United States Patent
Lau

(10) Patent No.: US 8,312,890 B1
(45) Date of Patent: Nov. 20, 2012

(54) DISSOLVABLE VALVE IN A FLUID PROCESSING DEVICE

(75) Inventor: Aldrich N. K. Lau, Palo Alto, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 1460 days.

(21) Appl. No.: 11/252,914

(22) Filed: Oct. 18, 2005

Related U.S. Application Data

(60) Provisional application No. 60/619,731, filed on Oct. 18, 2004, provisional application No. 60/619,677, filed on Oct. 18, 2004, provisional application No. 60/619,623, filed on Oct. 18, 2004.

(51) Int. Cl.
*F16K 17/14* (2006.01)

(52) U.S. Cl. ........... 137/67; 422/537; 422/503; 436/180

(58) Field of Classification Search .............. 137/67, 137/806; 251/12; 422/103, 537, 503; 436/180
See application file for complete search history.

(56) References Cited

U.S. PATENT DOCUMENTS

| | | | |
|---|---|---|---|
| 5,846,396 A * | 12/1998 | Zanzucchi et al. | 506/33 |
| 6,102,897 A | 8/2000 | Lang | |
| 6,152,181 A | 11/2000 | Wapner et al. | |
| 6,296,020 B1 * | 10/2001 | McNeely et al. | 137/806 |
| 6,302,134 B1 | 10/2001 | Kellogg et al. | |
| 6,375,901 B1 | 4/2002 | Robotti et al. | |
| 6,615,855 B2 | 9/2003 | Lopez et al. | |
| 6,755,621 B2 | 6/2004 | Lopez et al. | |
| 8,062,611 B2 * | 11/2011 | Faulstich et al. | 422/537 |
| 2002/0054835 A1 | 5/2002 | Robotti et al. | |
| 2002/0121487 A1 | 9/2002 | Robotti et al. | |
| 2002/0194909 A1 | 12/2002 | Hasselbrink, Jr. et al. | |
| 2003/0019522 A1 | 1/2003 | Parunak | |
| 2003/0210997 A1 | 11/2003 | Lopez et al. | |
| 2005/0109396 A1 * | 5/2005 | Zucchelli et al. | 137/67 |

FOREIGN PATENT DOCUMENTS

WO WO 01/02737 A1 1/2001

OTHER PUBLICATIONS

Notification of Transmittal dated Oct. 16, 2006, from PCT Application No. PCT/US05/37342.
Written Opinion of International Searching Authority dated Oct. 16, 2006, from PCT Application No. PCT/US05/37342.
International Search Report dated Oct. 16, 2006, from PCT Application No. PCT/US05/37342.
Iwata et al., *Atomic Force Microscopic Analysis of a Porous Membrane with pH-Sensitive Molecular Valves*, Macromolecules, 31, 3671-3678. (1998).
Beebe et al., *Functional Hydrogel Structures for Autonomous Flow Control Inside Microfluidic Channels*, Nature, vol. 404, 588-590, Apr. 6, 2000.

\* cited by examiner

*Primary Examiner* — Kevin Lee
*Assistant Examiner* — Macade Brown

(57) ABSTRACT

A fluid processing device, system, and method for processing a fluid, are provided. The device includes a substrate, a plurality of fluid retainment regions formed in or on the substrate, and a barrier at least partially separating two or more of the fluid retainment regions, wherein the barrier can include a solvent-dissolvable, LCST-free material.

21 Claims, 27 Drawing Sheets

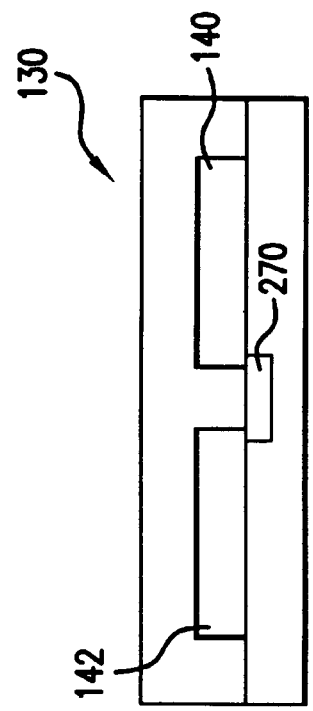
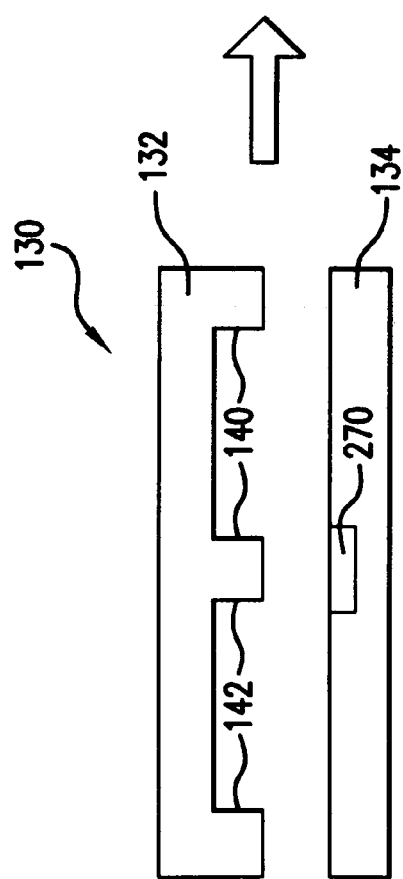
FIG. 6

DISSOLVABLE VALVE IN A FLUID PROCESSING DEVICE

CROSS-REFERENCE TO RELATED APPLICATIONS

The present application claims benefit from U.S. Provisional Applications Nos. 60/619,623, 60/619,677, and 60/619,731, all filed Oct. 18, 2004, and which are herein incorporated by reference in their entireties.

INTRODUCTION

The present teachings relate to a device, system, and methods, for processing fluids.

Undesired reactions can occur when mixing reaction components under less than ideal conditions, for example, mixing reagents for a polymerase chain reaction (PCR) at room temperature. For reactions to be carried out under conditions where space constraints require several reagents to be stored in the same chamber or in close proximity to one another, problems can arise if the reagents react with one another prior to a desired reaction time, temperature, or other condition. Even dry formulations are often limited by the hygroscopic nature of the reactants included in the formulations, causing limited shelf lives.

SUMMARY

According to various embodiments, a fluid processing device is provided that can comprise a substrate, a plurality of fluid retainment regions, and a barrier. The plurality of fluid retainment regions can be formed in or on the substrate and can comprise at least a first fluid retainment region and a second fluid retainment region. The barrier can comprise a water-soluble LCST-free material and can at least partially separate the first fluid retainment region from the second fluid retainment region.

According to various embodiments, the barrier can comprise any shape, for example, the barrier can be ring-shaped, square-shaped, star-shaped a polygon, or any other shape. The barrier can comprise, for example, an outer wall having the shape of a polygon. The barrier can be a plug. The barrier can comprise a fluid flow modulator arranged in a fluid passageway and adapted to open to establish fluid communication or to increase the rate of fluid communication, between at least two fluid retainment regions. The barrier can comprise a lower critical solution temperature (LCST) free material. The barrier can separate a first reagent for a reaction (first reaction component), retained in a first fluid retainment region, from a second reagent for the same reaction (second reaction component), retained in a second fluid retainment region. The first and second reagent components can be the same as or can differ from one another.

According to various embodiments, the fluid processing device can further comprise at least one additional fluid retainment region, at least one fluid passageway, and at least one actuatable valve arranged in the at least one fluid passageway. The fluid passageway, or each fluid passageway if there is more than one, can be in fluid communication with the at least one additional fluid retainment region and at least one other fluid retainment region. The actuatable valve can comprise a pressure-actuatable valve, for example, comprising a frangible diaphragm, or a heat-actuatable valve, for example, comprising at least one material selected from a rubber, a plastic, a wax, a paraffin, a polyethylene glycol material, a derivative of a polyethylene glycol, and a polysaccharide.

According to various embodiments, the barrier can comprise a flow modulator or valve disposed along a fluid passageway between two or more fluid retainment regions. The method can comprise flowing a fluid through a fluid passageway that had previously been interrupted by the barrier, thereby establishing or increasing the rate of fluid communication between two fluid retainment regions, thus allowing reaction components contained in each of the fluid retainment regions to mix upon fluid communication when the valve fully separates the fluid retainment regions, or allowing the rate of mixing to increase upon valve opening when the valve partially separates the fluid retainment regions.

According to various embodiments, the barrier material can consist of one or more LCST-free materials.

According to various embodiments, the device according to the present teachings can comprise at least one fluid retainment region.

According to some embodiments, the device according to the present teachings can comprise at least two fluid retainment regions.

According to some embodiments, the device according to the present teachings can comprise a sample retainment region, a reaction retainment region, at least one intermediate retainment region, and at least one reaction component retainment region. The retainment regions can be interconnected by at least one fluid passageway.

According to some embodiments, the device according to the present teachings can comprise at least one waste retainment region.

According to some embodiments, the device according to the present teachings can comprise a sample retainment region, a reaction retainment region, a first intermediate retainment region, a second intermediate retainment region, a first reaction component retainment region, and a second reaction component retainment region. The retainment regions can be interconnected by at least on fluid passageway.

According to some embodiments, the device can comprise no vent, at least one vent, or a plurality of vents, to relieve pressure resulting from a flow of a fluid and its communication. A vent can comprise a vent channel configured to relieve such pressure. A vent can be provided in communication with a retainment region, such that upon fluid flow resultant pressure is released. A vent channel can comprise a hydrophobic vent channel that allows air to travel through the channel but does not allow the flow of an aqueous fluid.

According to some embodiments, a device is provided that can comprise no vent and can be manufactured and sealed under vacuum whereby the device can comprise a low internal gas pressure relative to the external ambient pressure.

According to some embodiments, a device according to the present teachings can further comprise a first waste retainment region and a second waste retainment region.

According to some embodiments, the device can comprise one or more fluid passageways interconnecting the retainment regions.

According to some embodiments, the device can comprise a pressure-actuated valve provided in a fluid passageway. The fluid passageway comprising a pressure-actuated valve can be provided between a reaction component retainment region and an intermediate retainment region such that upon actuation of the valve, the direction of flow is from the reaction component retainment region to the intermediate retainment region.

According to some embodiments, the device can comprise a dissolvable valve provided in a fluid passageway. The fluid passageway comprising the dissolvable valve can be provided between an intermediate retainment region and a reaction retainment region such that the direction of flow is from the intermediate retainment region to the reaction retainment region. The dissolvable valve can provide automatic control of the fluid communication between the intermediate and reaction retainment regions. Flow can further be controlled by varying the cross-sectional area of the fluid passageway comprising a dissolvable valve.

According to some embodiments, the device can comprise a fluid passageway where fluid communication is controlled by the cross-sectional area of the fluid passageway. The cross-sectional controlled fluid passageway can be provided between an intermediate retainment region and a reaction retainment region such that the direction of fluid is from the intermediate retainment region to the reaction retainment region. The cross-sectional controlled fluid passageway can be provided between a sample retainment region and the reaction retainment region. Flow can be controlled by providing the cross-sectional controlled fluid passageway with a dissolvable valve.

According to some embodiments, the device according to the present teachings can comprise a capillary fluid passageway interconnecting a sample retainment region and a reaction retainment region such that the direction of flow is from the sample retainment region to the reaction retainment region.

According to some embodiments, the device according to the present teachings can comprise a capillary fluid passageway interconnecting a reaction retainment region and a waste retainment region such that the direction of flow is from the reaction retainment region to the waste retainment region.

According to some embodiments, the device can comprise a dissolvable valve provided in a fluid passageway. The fluid passageway comprising the dissolvable valve can be provided between a reaction retainment region and a waste retainment region such that the direction of flow is from the reaction retainment region to the waste retainment region.

According to some embodiments, a passageway comprising a dissolvable valve can be provided between a sample retainment region and a reaction retainment region, such that the direction of flow is from the sample retainment region to the reaction retainment region.

According to some embodiments, one or more fluid passageways comprising one or more dissolvable valves provided between at least two retainment regions, can comprise one or more discrete passageways, or can comprise a single, continuous passageway. The single, continuous passageway can comprise a single, extended dissolvable valve, for example a single, extended length of dissolvable valve material.

According to some embodiments, the device according to the present teachings, can comprise one or more retainment regions pre-loaded with one or more one reaction components.

It is to be understood that both the foregoing general description and the following detailed description are exemplary and explanatory only and are intended to provide a further explanation of the present teachings, as claimed.

DRAWINGS

Various embodiments of the present teachings are exemplified in the accompanying drawings. The teachings are not limited to the embodiments depicted in the drawings, and include equivalent structures and methods, as set forth in the following description and as would be known to those of ordinary skill in the art in view of the present teachings.

FIGS. 1(a), 1(b), and 1(c) schematically illustrate various stages in the operation of a valve according to some embodiments.

FIGS. 4A-4J schematically illustrate various stages in the operation of a diagnostic device according to an embodiment.

FIGS. 5A-5J schematically illustrate various stages in the operation of a diagnostic device according to an embodiment.

FIG. 6 illustrates the assembly of a diagnostic device from two separate pieces.

Figure 3:
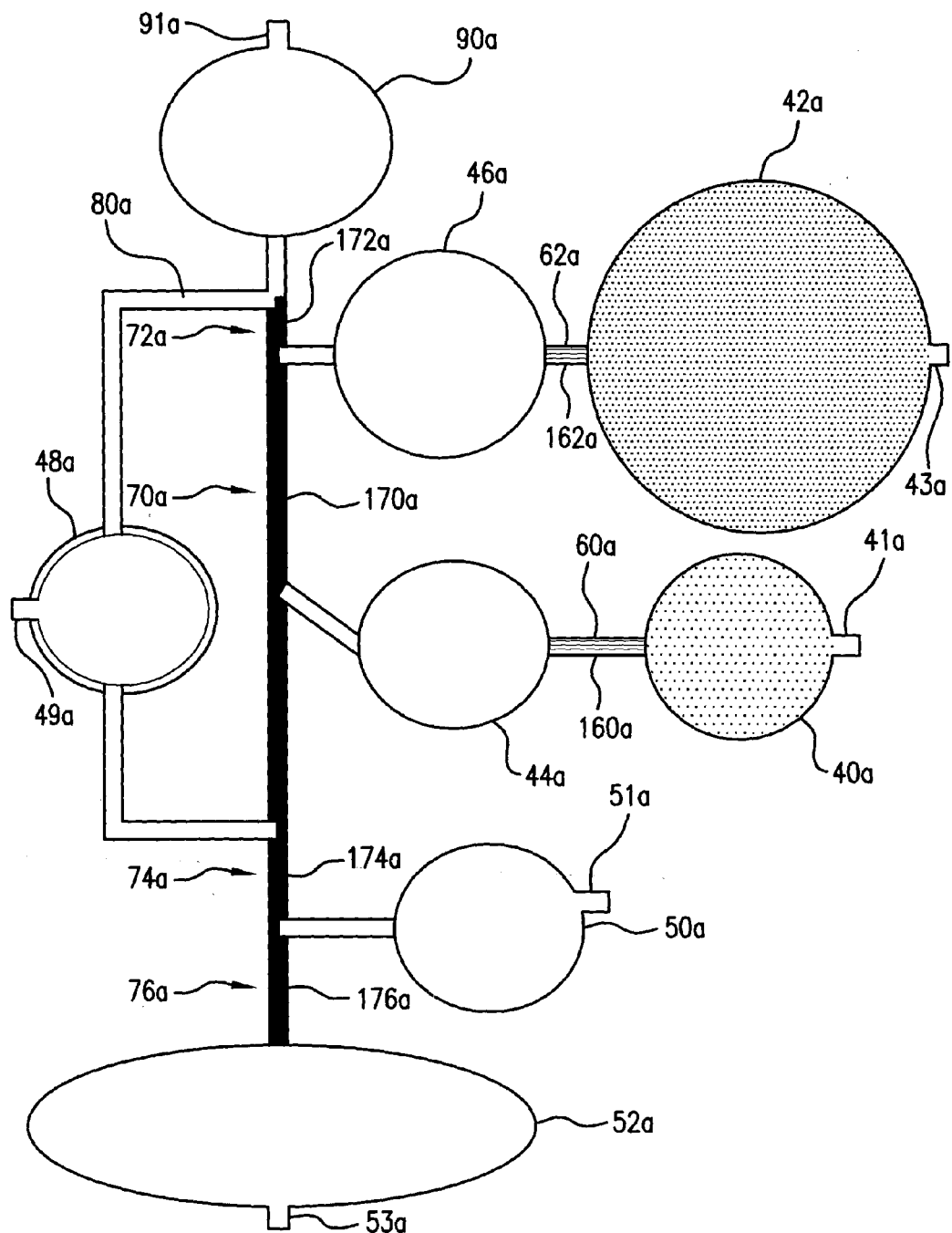
FIG. 3 is a schematic illustration of a diagnostic device according to some embodiments.
Figures 7, 8:
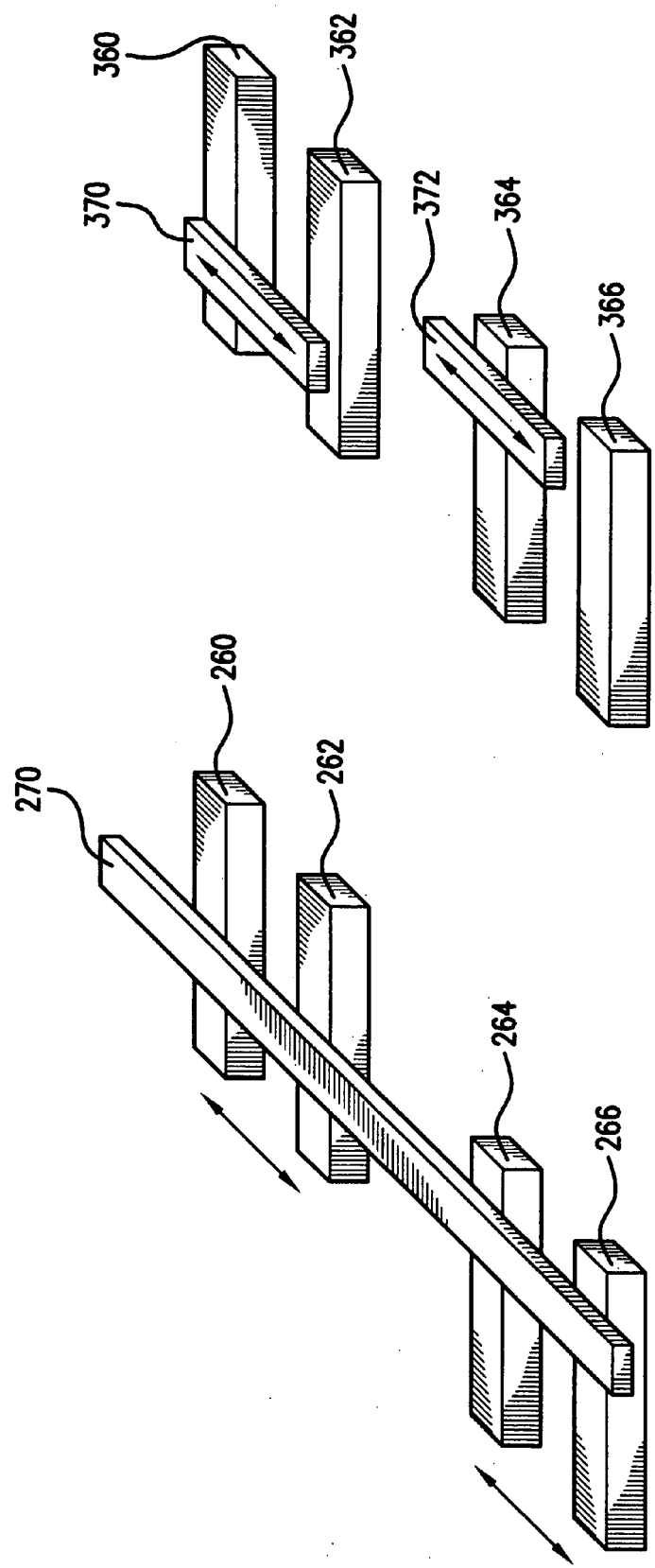

FIG. 7 illustrates the effect of misalignment of the pieces shown in FIG. 6 for an embodiment of the device as shown in FIG. 3.

Figure 2:
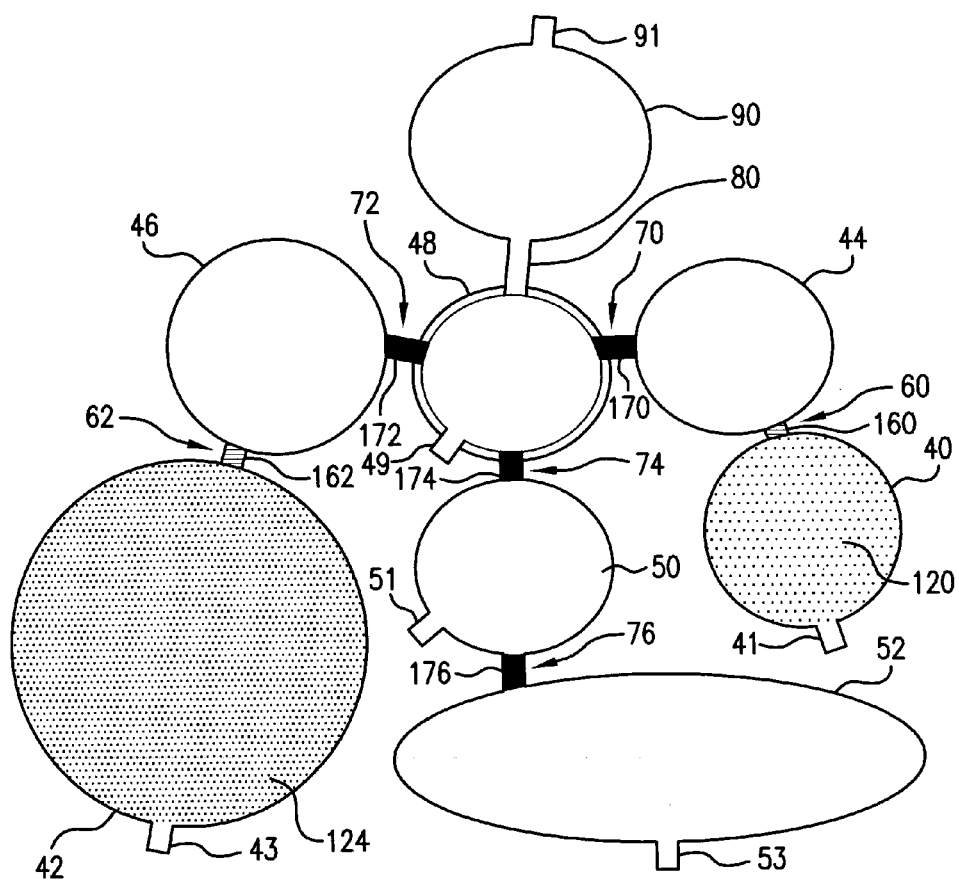
FIG. 2 is a schematic illustration of a diagnostic device according to some embodiments.

FIG. 8 illustrates the effect of misalignment of the pieces shown in FIG. 6 for an embodiment of the device as shown in FIG. 2.

Figure 9:
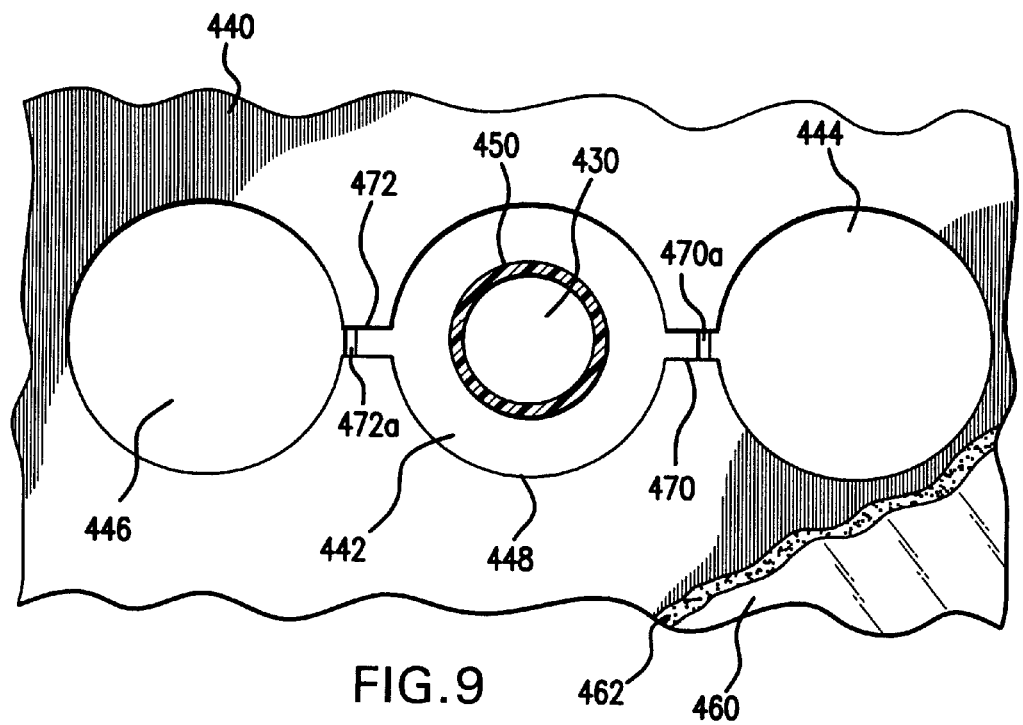

FIG. 9 illustrates an arrangement of reservoirs and a valve according to some embodiments.

Figure 10:
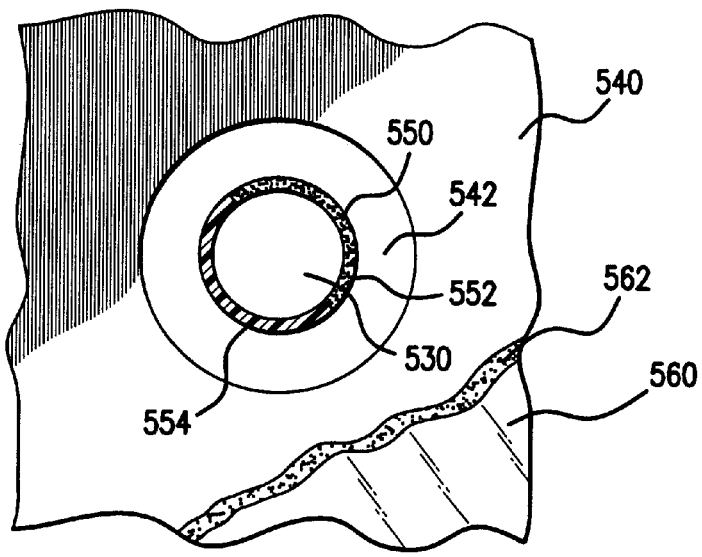

FIG. 10 illustrates an arrangement of reservoirs and a valve according to some embodiments.

Figure 11:
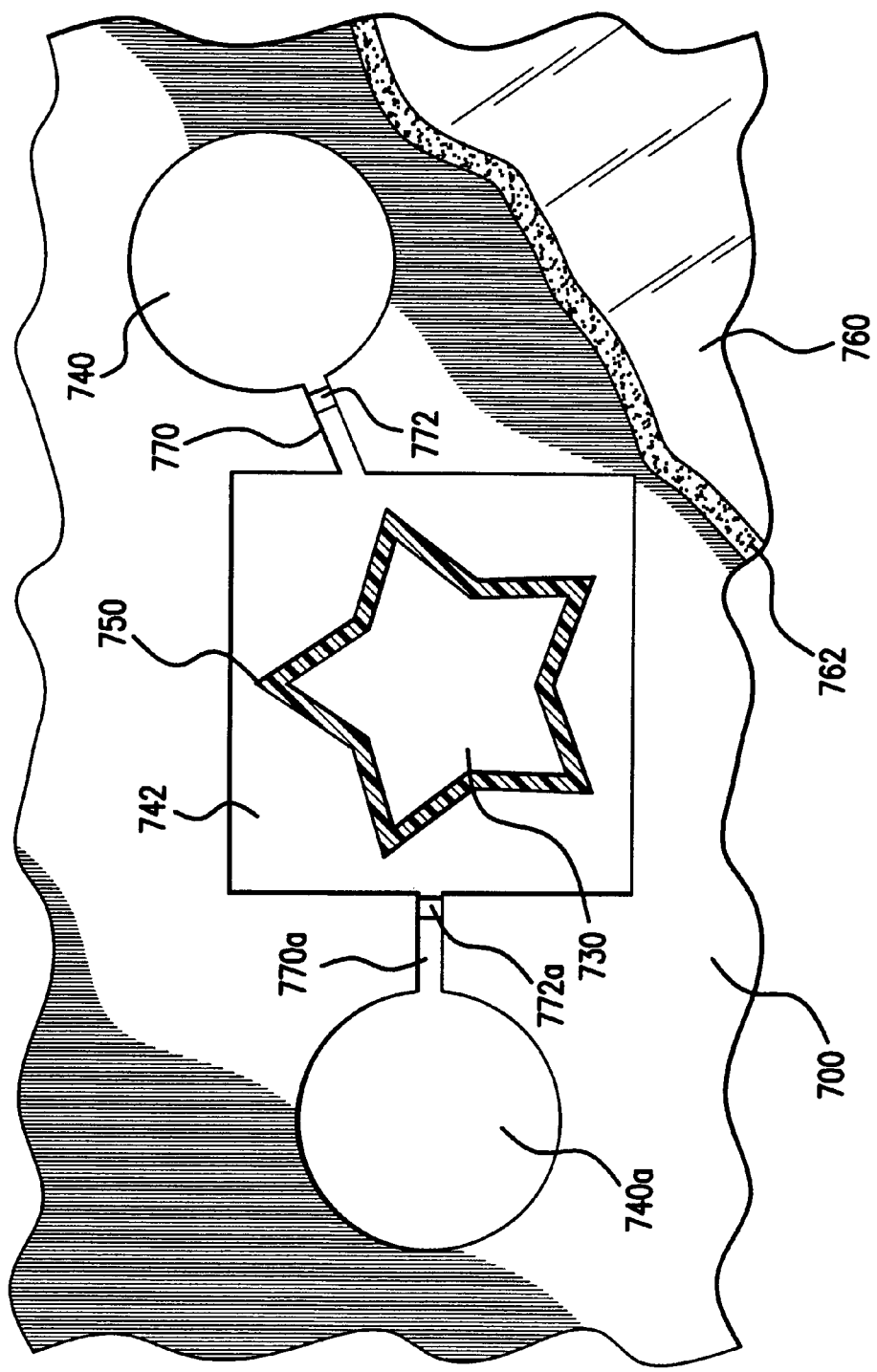

FIG. 11 illustrates an arrangement of reservoirs and a valve according to some embodiments.

It is to be understood that both the foregoing general description and the following detailed description are exemplary and explanatory only and are intended to provide a further explanation of the various embodiments of the present teachings.

DESCRIPTION OF VARIOUS EMBODIMENTS

Definitions: The below definitions serve to provide a clear and consistent understanding of the present teachings.

The term "barrier" is herein defined as a barrier that can fully separate one fluid retainment region from another fluid retainment region, or that can partially separate one fluid retainment region from another fluid retainment region. The separation can be physical separation.

The barrier can comprise a fluid flow modulator. The barrier can comprise a dissolvable material, for example, a water-soluble material. The dissolvable material can comprise an LCST-free material. The fluid flow modulator can comprise a valve and/or a shaped wall. The barrier can comprise a valve. The dissolvable valve can comprise a plug.

The term "solute bridge valve" is used synonymous with the term "dissolvable valve," as herein defined. A solute bridge valve can comprise one or more water-soluble homopolymers, random copolymers, block copolymers, diblock copolymers, or combinations thereof, derived from, for example, one or more of (meth)acrylic acid and its sodium salt, acryloylurea, 2-hydroxyethyl(meth)acrylate, hydroxymethyl(meth)acrylate, N-hydroxymethyl(meth)acrylamide, N-(2-hydroxyethyl)(meth)acrylamide, N-tris(hydroxymethyl)methyl(meth)acrylamide, 3-hydroxypropyl(meth)acrylate, N-methyl(meth)acrylamide, N-(meth)acryloxysuccinimide, 2-(meth)acrylamidoglycolic acid, N-(meth)acryloylmorpholine, N-(methyl)acryloyltris(hydroxymethyl)methylamine, (methyl)acryloylurea, N-methyl-N-vinylacetamide, N-methyl-N-vinylformaide, N-vinylacetamide, N-vinylformaide, vinylmethylether, vinylmethyloxazolidone, vinyloxazolidone, and N-vinylpyrolidone.

The barrier can be a fluid flow modulator disposed in a fluid passageway to fully or partially separate a first fluid retainment region from a second fluid retainment region wherein both regions are in fluid communication with the fluid passageway.

The dissolvable barrier can comprise a shaped wall that fully or partially separates an outer fluid retainment region from an inner fluid retainment region, where the outer fluid retainment region surrounds the inner fluid retainment region. The shaped wall can comprise dissolvable areas. The shaped wall can comprise both soluble and insoluble areas.

The term "fluid passageway" is herein defined as an area, a structure, or communication, that allows for fluid communication between at least two fluid retainment regions, for example, a channel connecting two regions.

One or more fluid passageways according to the present teachings can be configured or adapted to provide capillary driven flow.

One or more fluid passageways according to the present teachings can be configured or adapted to provide electrokinetic driven flow.

One or more of the fluid passageways according to the present teachings can be configured or adapted to control the rate and timing of fluid flow by varying the dimensions of the fluid passageway.

The terms "fluid passageway," "a fluid communication," "fluid flow channel," "fluid flow passageway," "flow channel," "flow control channel," and "flow control passageway," are each used synonymous with the term "fluid passageway," as herein defined.

The term "fluid flow modulator" is herein defined as a barrier that modulates the flow of a fluid. The fluid flow modulator can comprise a valve. The fluid flow modulator can comprise a shaped wall. The valve and/or the shaped wall, can comprise a dissolvable material. The fluid flow modulator can comprise a dissolvable valve that can be disposed in a fluid passageway in fluid communication with at least two fluid retainment regions. The dissolvable valve can fully or partially block fluid flow through the flow passageway. The dissolvable valve can be adapted to establish fluid communication or to increase the rate of fluid communication, between the at least two fluid retainment regions. The dissolvable valve comprises an LCST-free material.

The term "fluid retainment region" is herein defined as an area that can comprise a reagent or other reaction component for a reaction where the fluid retainment region is in fluid communication with, fully separate from, or partially separate from, another fluid retainment region that can comprise another reagent or reaction component for the reaction that is the same as or different from the first reagent. A first fluid retainment region can be separate from a second fluid retainment region, or a first fluid retainment region can be surrounded by a second fluid retainment region, where the first and second fluid retainment regions are separated by a barrier comprising a shaped-wall.

A fluid retainment region can comprise any area, structure, or form, capable of retaining a volume of fluid. A fluid retainment region can be used, for example, to retain, process, react, store, incubate, transfer, purify, or the like, a fluid sample. A fluid retainment region can comprise a surface area, an area, a recess, a reservoir, a chamber, a depression, a well, a space, or the like. According to some embodiments, a fluid retainment region can comprise, for example, a flat surfaces with hydrophobic regions surrounding hydrophilic loci for receiving, containing, retaining, or binding a sample. A fluid retainment region can comprise any shape, for example, round, teardrop, square, polygon, star, irregular, ovoid, rectangular, or the like. A fluid retainment region or channel can comprise any cross-section configuration, for example, square, round, ovoid, irregular, trapezoid, or the like.

The terms "reservoir," "fluid retainment region," "retainment region," and "region," are used synonymously herein.

According to various embodiments; the term "fluid" means a gas, an aqueous fluid, a non-aqueous fluid, a vacuum, or a partial vacuum. A gas can comprise, for example, air. Where two retainment regions are separated by a fluid flow modulator, one retainment region can comprise, for example, an aqueous or non-aqueous fluid retained therein, while the other retainment region can comprise a gas or a vacuum or partial vacuum, contained therein.

The term "LCST material" is herein defined as a temperature-responsive polymer that exhibits "lower critical solution temperature" behavior. A temperature-responsive polymer that exhibits LCST behavior is a polymer that is soluble in a solvent at temperature below the LCST, but becomes insoluble above the LCST. The dissolved polymer at a temperature above the LCST, becomes insoluble and undergoes phase separation whereby precipitates may or may not form. The solvent can be water.

The term "LCST-free material" is herein defined as any material that does not exhibit the temperature-dependent change in solvability exhibited by LCST materials as defined herein. The LCST-free material can comprise a material that is water-soluble at room temperature. LCST-free materials can comprise one or more of, for example, a homopolymer, a copolymer, or their blends derived from, for example, one or more of acrylamide monomers, acrylic esters, vinyl ethers, N-vinylamides, vinyl acids and their sodium salts; other nitrogen-containing vinyl monomers, for example, but not limited to, polyamines, linear and branched poly(alkylene imines), poly(silicic acids) and salts thereof, poly(maleic acids), poly(maleic anhydride-alt-methylvinyl ether) and its hydrolyzed version; and a combination thereof. Suitable monomers can comprise acryloyl, acryloxyl, acrylate, and acrylamide, each of which can comprise methacryloyl, methacryloxyl, methacrylate, and methacrylamide, respectively. Suitable water-soluble monomers can comprise one or more of (meth)acrylic acid and its sodium salt, acryloylurea, 2-hydroxyethyl(meth)acrylate, hydroxymethyl(meth)acrylate, N-hydroxymethyl(meth)acrylamide, N-(2-hydroxyethyl)(meth)acrylamide, N-tris(hydroxymethyl)methyl(meth)acrylamide, 3-hydroxypropyl(meth)acrylate, N-methyl(meth)acrylamide, N-(meth)acryloxysuccinimide, 2-(methy)acrylamidoglycolic acid, N-(meth)acryloylmorpholine, N-(methyl)acryloyltris(hydroxymethyl)methylamine, (methyl)acryloylurea, N-methyl-N-vinylacetamide, N-methyl-N-vinylformaide, N-vinylacetamide, N-vinylformaide, vinylmethylether, vinylmethyloxazolidone, vinyloxazolidone, N-vinylpyrrolidone, and combinations thereof.

The term "reagent for reaction," is herein defined as one or more reagents or components necessary or desirable for use in one or more reactions or processes, for example, one or more components that in any way affect how a desired reaction can proceed. The reagent for reaction can comprise a reactive component. However, it is not necessary that the reagent participate in the reaction. The reagent for reaction can comprise a non-reactive component. The reagent for reaction can comprise a recoverable component comprising for example, a solvent and/or a catalyst. The reagent for reaction can comprise a promoter, accelerant, or retardant that is not necessary for a reaction but affects the reaction, for example, affects the rate of the reaction. The reagent for reaction can comprise one or more of a solid reagent for reaction and a fluid reagent for reaction. The term "reaction component" is used synonymous with the term "reagent for reaction," as herein defined. The reagent for reaction can comprise one or more of a fluid and a solid. A retainment region can be pre-loaded with one or more reagents for reaction.

The term "vent" is herein defined as any configuration or structure that relieves vacuum and/or back pressure, or equalizes pressure in a fluid processing device. A vent can comprise a channel or a microchannel. A vent can comprise a non-flow through vent in which gas that is displaced by a fluid can collect. A non-flow through vent can comprise, for example, a hydrophobic vent.

According to various embodiments, suitable reactions or processes can comprise one or more of a sample preparation process, a washing process, a sample purification process, a pre-amplification process, a pre-amplified product purification process, an amplification process, an amplified product purification process, a separation process, a sequencing process, a sequencing product purification process, a labeling process, a detecting process, or the like. Processing components can comprise sample preparation components, purification components, pre-amplification reaction components, amplification reaction components, sequencing reaction components, or the like. The skilled artisan can readily select and employ suitable components for a desired reaction or process, without undue experimentation.

According to some embodiments, processing or reaction components can be disposed in one or more retainment regions, channels, or fluid passageways, using any methods known in the art. For example, components can be sprayed and dried, delivered using a diluent, injected using a capillary, a pipette, and/or a robotic pipette, or otherwise disposed in the regions or channels.

According to various embodiments, a fluid processing device is provided that can comprise one or more fluid passageways that can comprise one or more elements, for example, one or more of a channel, a branch channel, a valve, a flow splitter, a vent, a port, an access area, a via, a bead, a reagent containing bead, a cover layer, a reaction component, any combination thereof, and the like. Any element can be in fluid communication with another element.

The term "fluid communication" is herein defined as either direct fluid communication, for example, two regions can be in fluid communication with each other via an unobstructed fluid passageway connecting the two regions or can be capable of being in fluid communication, for example, two regions can be capable of fluid communication with each other when they are connected via a fluid passageway that can comprise a valve disposed therein, wherein fluid communication can be established between the two regions upon actuating the valve, for example, by dissolving a dissolvable valve disposed in the channel.

As used herein, the term "in fluid communication" refers to in direct fluid communication and/or capable of direct fluid communication, unless otherwise expressly stated. The term "in valved fluid communication" refers to elements wherein a valve is disposed between the elements, such that upon opening or actuating the valve, fluid communication between the elements is established.

According to some embodiments, the term "capillary flow" is herein defined as passive flow resulting from a capillary potential gradient or a surface potential gradient, created during device fabrication that can direct the flow of liquid via capillary effect (surface tension).

According to some embodiments a fluid processing device is provided. The device can comprise a substrate that can comprise, for example, a top or a first surface, and one or more fluid passageways that can be provided in communication with and/or can be defined by, for example, at least a portion of the top or first surface of the substrate. The one or more fluid passageways can be provided, for example, in a top or first surface of a substrate, on a top or first surface of a substrate, in a substrate, in a bottom or second surface of a substrate, on a bottom or second surface of a substrate, in an edge of a substrate, on an edge of a substrate, or any combination thereof. A fluid processing device can comprise different levels and layers of fluid passageways that can comprise, for example, different levels and layers of channels and regions. For example, a tiered, multi-channel device can comprise one or more fluid passageways that traverse different heights or levels in the substrate.

Throughout the application, descriptions of various embodiments use "comprising" language; however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value ±5%. Therefore, for example, about 100 nl, could mean 95-105 nl. At the very least, each numerical parameter should at least be construed in light of the number of reported significant digits and by applying ordinary rounding techniques.

As used herein, the term "plurality" is defined as "two or more." Herein, the term "two or more" is used synonymously with the term "plurality."

According to various embodiments, a fluid processing device is provided that can comprise a substrate, a plurality of fluid retainment regions, and a barrier. The plurality of fluid retainment regions can be formed in or on the substrate and can include at least a first fluid retainment region and a second fluid retainment region. The barrier can at least partially separate the first fluid retainment region from the second fluid retainment region. The barrier can comprise a solvent-dissolvable LCST-free material. According to some embodiments, the solvent-dissolvable LCST-free material can comprise a polymer made from at least one or more acrylamide monomers. The one or more acrylamide monomers can comprise one or more of:

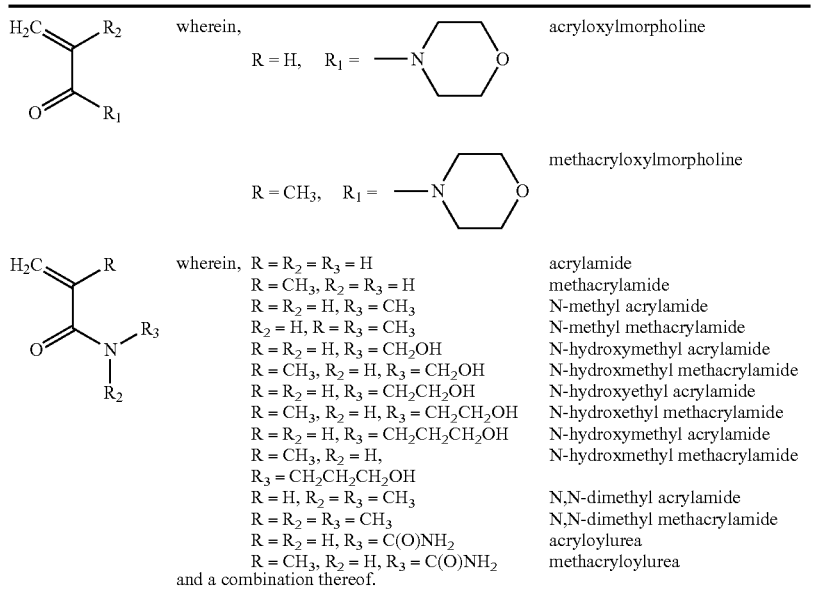

| | |
|---|---|
| wherein, R = R$_2$ = R$_3$ = H | acrylamide |
| R = CH$_3$, R$_2$ = R$_3$ = H | methacrylamide |
| R = R$_2$ = H, R$_3$ = CH$_3$ | N-methyl acrylamide |
| R$_2$ = H, R = R$_3$ = CH$_3$ | N-methyl methacrylamide |
| R = R$_2$ = H, R$_3$ = CH$_2$OH | N-hydroxymethyl acrylamide |
| R = CH$_3$, R$_2$ = H, R$_3$ = CH$_2$OH | N-hydroxmethyl methacrylamide |
| R = R$_2$ = H, R$_3$ = CH$_2$CH$_2$OH | N-hydroxyethyl acrylamide |
| R = CH$_3$, R$_2$ = H, R$_3$ = CH$_2$CH$_2$OH | N-hydroxethyl methacrylamide |
| R = R$_2$ = H, R$_3$ = CH$_2$CH$_2$CH$_2$OH | N-hydroxymethyl acrylamide |
| R = CH$_3$, R$_2$ = H, R$_3$ = CH$_2$CH$_2$CH$_2$OH | N-hydroxmethyl methacrylamide |
| R = H, R$_2$ = R$_3$ = CH$_3$ | N,N-dimethyl acrylamide |
| R = R$_2$ = R$_3$ = CH$_3$ | N,N-dimethyl methacrylamide |
| R = R$_2$ = H, R$_3$ = C(O)NH$_2$ | acryloylurea |
| R = CH$_3$, R$_2$ = H, R$_3$ = C(O)NH$_2$ | methacryloylurea | and a combination thereof.

According to various embodiments, the solvent-dissolvable LCST-free material can comprise a polymer made from at least one or more acrylic esters. The one or more acrylic esters can comprise one or more of:

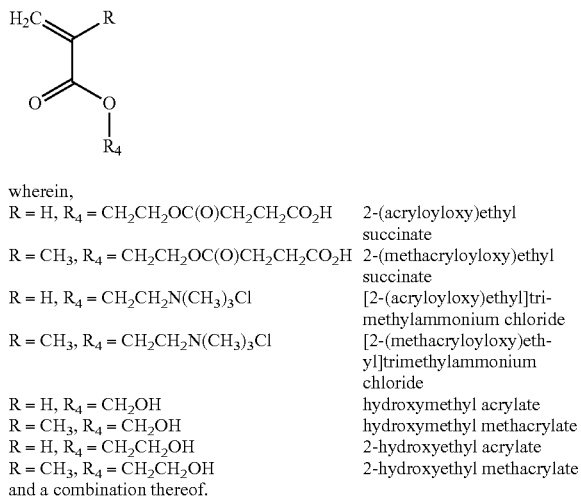

wherein,
| | |
|---|---|
| R = H, R$_4$ = CH$_2$CH$_2$OC(O)CH$_2$CH$_2$CO$_2$H | 2-(acryloyloxy)ethyl succinate |
| R = CH$_3$, R$_4$ = CH$_2$CH$_2$OC(O)CH$_2$CH$_2$CO$_2$H | 2-(methacryloyloxy)ethyl succinate |
| R = H, R$_4$ = CH$_2$CH$_2$N(CH$_3$)$_3$Cl | [2-(acryloyloxy)ethyl]trimethylammonium chloride |
| R = CH$_3$, R$_4$ = CH$_2$CH$_2$N(CH$_3$)$_3$Cl | [2-(methacryloyloxy)ethyl]trimethylammonium chloride |
| R = H, R$_4$ = CH$_2$OH | hydroxymethyl acrylate |
| R = CH$_3$, R$_4$ = CH$_2$OH | hydroxymethyl methacrylate |
| R = H, R$_4$ = CH$_2$CH$_2$OH | 2-hydroxyethyl acrylate |
| R = CH$_3$, R$_4$ = CH$_2$CH$_2$OH | 2-hydroxyethyl methacrylate | and a combination thereof.

According to various embodiments, the solvent-dissolvable LCST-free material can comprise a polymer made from at least one or more vinyl ethers. The one or more vinyl ethers can comprise one or more of:

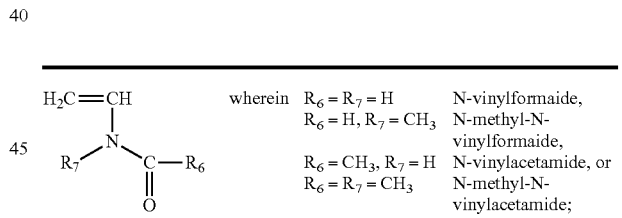

| | |
|---|---|
| wherein R$_5$ = CH$_3$ | vinyl methyl ether or |
| R$_5$ = CH$_2$CH$_2$OH | ethylene glycol vinyl ether; | and a combination thereof.

According to various embodiments, the solvent-dissolvable LCST-free material can comprise a polymer made from at least one or more N-vinylamides. The one or more N-vinylamides can comprise one or more of:

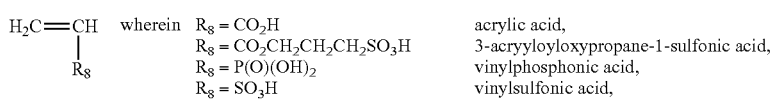

| | |
|---|---|
| wherein R$_6$ = R$_7$ = H | N-vinylformaide, |
| R$_6$ = H, R$_7$ = CH$_3$ | N-methyl-N-vinylformaide, |
| R$_6$ = CH$_3$, R$_7$ = H | N-vinylacetamide, or |
| R$_6$ = R$_7$ = CH$_3$ | N-methyl-N-vinylacetamide; | and a combination thereof.

According to various embodiments, the solvent-dissolvable LCST-free material can comprise a polymer made from at least one or more vinyl acids and their sodium salts. The one or more vinyl acids and their sodium salts can comprise one or more of:

| | | |
|---|---|---|
| H$_2$C=CH<br>\|<br>R$_8$ | wherein R$_8$ = CO$_2$H | acrylic acid, |
| | R$_8$ = CO$_2$CH$_2$CH$_2$CH$_2$SO$_3$H | 3-acryyloyloxypropane-1-sulfonic acid, |
| | R$_8$ = P(O)(OH)$_2$ | vinylphosphonic acid, |
| | R$_8$ = SO$_3$H | vinylsulfonic acid, |

-continued

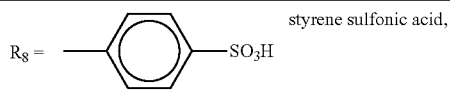  styrene sulfonic acid,

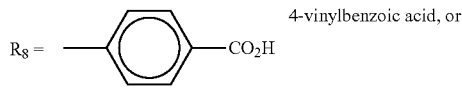  4-vinylbenzoic acid, or $R_8 = NHC(O)CH_2CH_2CO_2H$     N-vinylsuccinamidic acid;
and a combination thereof.

According to various embodiments, the solvent-dissolvable LCST-free material can comprise a polymer made from at least one or more nitrogen-containing vinyl monomers. The one or more nitrogen-containing vinyl monomers can comprise one or more of:

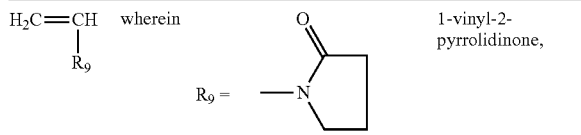 1-vinyl-2-pyrrolidinone,

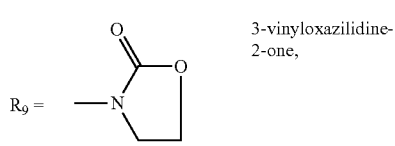 3-vinyloxazilidine-2-one,

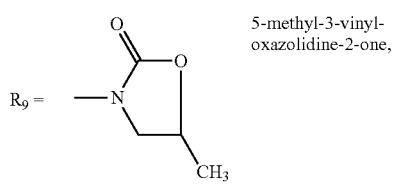 5-methyl-3-vinyl-oxazolidine-2-one,

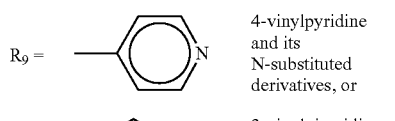 4-vinylpyridine and its N-substituted derivatives, or

 2-vinylpiperidine;

and a combination thereof.

According to various embodiments, the solvent-dissolvable LCST-free material can comprise a polymer made from at least one or more polyamines. The polymer can comprise a molecular weight of from about 2,000 to about 5,000,000 MDaltons. The one or more polyamines can comprise one or more of:

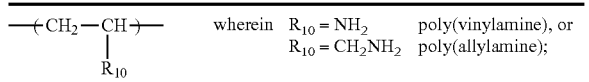 wherein $R_{10} = NH_2$   poly(vinylamine), or
$R_{10} = CH_2NH_2$   poly(allylamine);

and a combination thereof.

According to various embodiments, the solvent-dissolvable LCST-free material can comprise a polymer made from at least one or more of linear and branched poly(alkylene imine)s. The polymer can comprise a molecular weight of from about 1,000 to about 5,000,000 Daltons. The one or more linear and branched poly(alkylene imine)s can comprise one or more of:

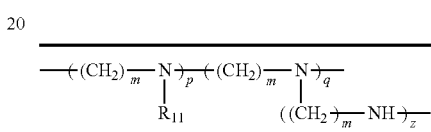

wherein,
$R_{11} = H, m = 2$            branched poly(ethylene imine)
$R_{11} = H, m = 2, z = o$     linear poly(ethylene imine)
$R_{11} = C(O)CH_3, m = 2, q = 0$   poly(2-methyl-2-oxazoline)
$R_{11} = C(O)C_2H_5, m = 2, q = 0$   poly(2-ethyl-2-oxazoline)
and a combination thereof.

According to various embodiments, the solvent-dissolvable LCST-free material can comprise a polymer made from at least one or more of poly(silicic acid)s and its salts. The polymer can comprise a molecular weight of from about 200 to about 2,000,000 Daltons. The polymer made from one or more of poly(silicic acid)s and its salt can comprise one or more of:

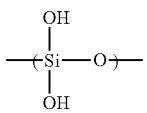

and a combination thereof.

According to various embodiments, the solvent-dissolvable LCST-free material can comprise a polymer made from at least poly(maleic acid). The polymer made from poly(maleic acid) can comprise one or more of:

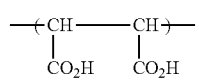

and a combination thereof.

According to various embodiments, the solvent-dissolvable LCST-free material can comprise a polymer made from at least one or more of poly(maleic anhydride-alt-methylvinyl ether) and its hydrolyzed version. The polymer made from one or more of poly(maleic anhydride-alt-methylvinyl ether) and its hydrolyzed version, can comprise one or more of:

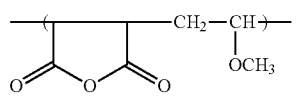

and a combination thereof.

The molecular weight of the polymer making-up or included in the solvent-dissolvable, LCST-free material can be, for example, from about 500 Daltons to about 5,000,000 Daltons, from about 10,000 Daltons to about 3.000,000 Daltons, or from about 50,000 Daltons to about 1,000,000 Daltons.

According to various embodiments, a diagnostic device, that can be either portable or nonportable, is provided. The diagnostic device can perform one or more predetermined assays as desired, for example, in nucleic acid sequence detection technology. For a given assay, the assay protocol can involve a set of fluid handling steps such as mixing, incubating, washing, and the like, which are desirably performed in a given sequence of steps and for specified time periods for samples and reagents in specified volumes or proportions. The device can be miniaturized to the point that it can be used as a handheld portable diagnostic device.

As shown in the exemplary embodiments illustrated in FIG. 2 and FIG. 3, the diagnostic device can comprise a plurality of fluid retainment regions, as exemplified below, interconnected by fluid passageways. A retainment region can comprise a vent to relieve pressure resulting from fluid flow. The plurality of regions can be included within a container, for example, comprising a closed, disposable cuvette where all of the regions are closed to fluid flow to or from locations outside of the cuvette. The plurality of regions in the cuvette can include a reaction region, one or more reagent regions, for example two reagent regions, each containing unreacted reagents, a sample region that can contain or receive a sample to be reacted with the unreacted reagents, and a barrier. The unreacted reagents, can comprise enzymes, buffers, catalysts, or other reaction components, and can be contained in a first set of regions that are interconnected with an intermediate set of regions by fluid passageways that can comprise one or more pressure-actuated valves. The intermediate regions can also be connected through fluid passageways to a reaction region, with the fluid passageways that connect the intermediate region to the reaction region comprising a material, for example dissolvable valve, that is adapted to reduce in volume within the fluid passageways when brought into contact with fluids from the intermediate regions, or when brought into contact with a sample after the sample has been added to the sample region.

A user can operate the diagnostic device by injecting a sample into the sample region, prior to, at the same time as, or subsequent to pushing a button or otherwise applying pressure to the regions that contain unreacted reagents. For example, a user can inject a sample and then push a button or other feature or area of the device. As an example of an assay performed with a device according to various embodiments, a typical ligation assay for detection of oligo-nucleotides can comprise constituents comprising the sample, a ligation oligomer, ligation reagent which can be a mixture of enzyme and buffer, a wash buffer, and extension and detection reagents. The sample, the ligation oligomer, and the ligation reagent can be allowed to mix and react along with wash buffers and the extension and detection reagents in an automatically controlled process. The process can occur after a user has injected the sample into the sample region and has released the reagents from the unreacted reagent regions by applying pressure to those regions.

According to some embodiments, a diagnostic device can be provided that uses capillary driven flow for fluid actuation. The flow cross-section of a fluid passageway interconnecting various regions can contribute to the rate at which reagents and sample are mixed in a reaction region.

According to some embodiments, a solvent-dissolvable LCST-free material valve or valves can be placed within a fluid passageway interconnecting regions and can provide automatic flow control and timing of fluid actuation.

According to some embodiments, a fluid flow modulator, as exemplified below with reference to a valve in a fluid passageway interconnecting fluid retainment regions, can comprise a LCST-free material that dissolves in water. Herein, the phrase "dissolvable valve" will be used interchangeably with the phrase "solute bridge valve." The solute bridge valve can automatically control flow through the fluid passageway interconnecting the fluid retainment regions and control the timing of fluid actuation by exploiting the time it takes to dissolve, melt, or otherwise wash-away or reduce the volume of the material making up the solute bridge valve.

According to some embodiments, the fluid processing device can comprise a fluid passageway, a plurality of fluid retainment regions with at least two of the fluid retainment regions each being in fluid communication with the fluid passageway, and a fluid flow modulator arranged in the fluid passageway and adapted to open and form, or to increase in size, a fluid communication between the at least two fluid retainment regions. The fluid flow modulator can comprise an LCST-free material that can be adapted to dissolve when contacted with a first liquid. The first liquid can be, for example, and aqueous solution, suspension, mixture, or other aqueous material. The barrier can be adapted to dissolve in water at room temperature. At least one of the plurality of fluid retainment regions can comprise an aqueous fluid retained therein.

According to some embodiments, the fluid processing device can comprise a fluid flow modulator in the form of a valve. The valve can block fluid flow through a flow passageway. The valve can be adapted or configured to only partially block fluid flow through the flow passageway.

The LCST-free material can be dissolvable in response to one or more stimulus. Exemplary stimuli can comprise contact with a first fluid or liquid, contact with an aqueous material and subsequent dissolution, contact with an acidic material, contact with an alkali material, contact with a material at a minimum temperature, or a combination thereof.

A barrier can separate a first reagent for a reaction, retained in the first fluid retainment region, from a second reagent for the same reaction, retained in the second fluid retainment region. The first and second reagents can be the same as, or differ from, one another. For example, a first reagent comprising a PCR mastermix including nucleotides can be separated, by the barrier, from a second reagent including a PCR enzyme.

According to some embodiments, a barrier can be ring-shaped, square-shaped, star-shaped, a polygon, or any other shape. The barrier can comprise, for example, an outer wall having the shape of a polygon. The barrier can comprise a fluid flow modulator arranged in a flow passageway and adapted to open to form, or to increase in size, a fluid communication region between at least two fluid retainment regions.

Barriers, flow modulators, and valves, and designs therefore, are described in U.S. Provisional Patent Application No.

60/619,677, to Banerjee et al., in U.S. Provisional Patent Application No. 60/619,731, to Banerjee et al., and in U.S. Provisional Patent Application No. 60/619,623, to Faulstich et al., all filed on Oct. 18, 2004, and all of which are incorporated herein, in their entireties, by reference.

According to some embodiments, a fluid processing device can comprise a fluid passageway dimensioned so that a flow of fluid from at least one of two or more fluid retainment regions and through the fluid passageway, can occur by capillary action. One or more fluid passageways can comprise one or more maximum dimensions of about 5 millimeter or less, for example, about 2 millimeters or less, or about 1 millimeter or less.

According to some embodiments, a fluid processing device can comprise a fluid passageway dimensioned so that a migration of charged components in a fluid, from at least one of the fluid retainment regions through the fluid passageway, is capable of migration by electrokinetic action. One or more fluid passageways can comprise one or more maximum dimension of about 5 millimeter or less, for example, about 2 millimeters or less, or about 1 millimeter or less.

According to some embodiments, a fluid processing device can comprise at least two electrodes disposed in the device with a fluid passageway therebetween. A system can be provided that comprises electrical leads that can be electrically connected to the electrodes.

According to some embodiments, a fluid processing device can comprise at least one additional fluid retainment region, at least one additional fluid passageway, and at least one pressure-actuatable valve arranged in the at least one additional fluid passageway. The additional fluid passageway can be in fluid communication with the additional fluid retainment region and one or more other fluid retainment regions. The pressure-actuatable valve can comprise a frangible diaphragm. The frangible diaphragm can comprise a material that is insoluble in water at room temperature. The pressure-actuatable valve can comprise a burstable valve that is adapted to open and establish fluid communication only upon receiving pressure of at least about 0.1 psig, for example, at least about 0.5 psig, at least about one psig, or at least about 3 psig from a fluid in at least one additional fluid retainment region. The device can comprise a liquid retained in at least one additional fluid retainment region.

According to some embodiments, a fluid processing device can comprise at least one heat-actuatable valve arranged in at least one additional fluid passageway. The at least one additional fluid passageway can be in fluid communication with at least one additional fluid retainment region and at least one of the plurality of fluid retainment regions. The heat-actuatable valve can comprise at least one material selected from a rubber, a plastic, a wax, a paraffin, a polyethylene glycol material, a derivative of a polyethylene glycol material, a polysaccharide, a derivative of polysaccharide, and combinations thereof. The heat-actuatable valve can comprise a material that is insoluble in water at room temperature. The heat-actuatable valve can comprise a material that has a melting point of from about 35° C. to about 95° C., for example, from about 35° C. to about 70° C., from about 35° C. to about 65° C., or from about 35° C. to about 50° C.

According to some embodiments, a fluid processing device can comprise a liquid retained in at least one fluid retainment region. The fluid processing device can comprise a first reagent for a reaction, retained in at least a first one of the plurality of fluid retainment regions. The fluid processing device can comprise a second reagent for the reaction retained in at least a second one of the plurality of fluid retainment regions. The second reagent can be the same as, or can differ from, the first reagent.

According to some embodiments, methods are provided for processing a fluid. A method can comprise contacting a barrier with a first liquid in which the barrier is dissolvable. The barrier can retain a material that can be soluble in the first liquid, or insoluble in the first liquid.

According to some embodiments, a method is provided that can comprise processing a fluid using a processing device that comprises at least a first fluid retainment region and a second fluid retainment region, and a barrier arranged between them. At least one of the first and second fluid retainment regions retains an aqueous solution. The barrier can comprise one or more of the aforementioned LCST-free barrier materials. The barrier can be adapted or configured sufficient to dissolve when contacted with a first liquid, for example, an aqueous solution or an organic solvent. According to various embodiments, the method can comprise contacting the barrier with a first aqueous solution to dissolve at least a portion of the barrier and form, or increase the size of, a fluid communication between the first fluid retainment region and the second fluid retainment region. The fluid processing device can comprise at least one additional fluid retainment region, at least one fluid passageway, and at least one pressure-actuatable valve arranged in the at least one fluid passageway. The at least one fluid passageway can be in fluid communication with the at least one additional fluid retainment region and at least one of the first fluid retainment region and the second fluid retainment region. The method can comprise opening the pressure-actuatable valve. The pressure-actuatable valve can comprise a diaphragm and the method can comprise bursting the diaphragm by applying pressure to the diaphragm. A heat-actuatable valve can be actuated instead of, or in addition to, actuation of a pressure-actuatable valve.

According to some embodiments, a method can comprise migrating charged components in a sample from at least one of the at least two fluid retainment regions, through a fluid passageway, by electrokinetic motion. Migration of the charged components can be accomplished by creating an electric field in the device. A system can be provided that includes an electric field generator.

According to some embodiments, a method can comprise creating a pressure differential between a first fluid retainment region and a second fluid retainment region, and moving, with the pressure differential, a fluid from one of the first fluid retainment region and the second fluid retainment region into the other of the first fluid retainment region and the second fluid retainment region. The pressure differential can be generated by activating a pump. The pressure differential can comprise a positive-pressure differential or negative-pressure differential. A positive pressure means a pressure at or greater than atmospheric pressure, i.e., 1 atm. A negative pressure means a pressure less than atmospheric pressure, i.e. less than 1 atm.

According to various embodiments, a method can comprise creating a magnetic field across a first fluid retainment region and a second fluid retainment region, and moving, with the magnetic field, magnetically attractable materials from one of the retainment regions toward the other retainment region.

According to some embodiments, the method can comprise performing a set of predetermined assays in a plurality of fluid retainment regions, for example, reservoirs, in a closed, disposable device. An exemplary device is a cuvette. The fluid retainment regions can be interconnected by fluid passageways, for example, channels, but closed to fluid flow to or from locations outside of the cuvette. The first fluid retainment regions can be selectively closed-off from fluid communication with second fluid retainment regions through first channels that interconnect them. Selective closing-off can be provided by pressure-actuated valves positioned in the first channels. The second fluid retainment regions can be interconnected to third fluid retainment regions by second channels. Flow through the second channels can be controlled by fluid flow modulators positioned in the second channels, which can also provide selective closing-off. The method can comprise applying pressure to a pressure-actuated valve in a first channel sufficient to break the valve and provide fluid communication between the first and second fluid retainment regions. Such a method can be used to introduce a sample for testing or other processing into one or more third fluid retainment regions and/or establishing fluid communication between the second fluid retainment regions and one or more third fluid retainment regions, at a controlled rate. The controlled rate can be a function of characteristics of at least one of a fluid in a third region and a fluid within the second regions.

According to some embodiments, a system is provided that can comprise a fluid processing device as described herein, and a pump, wherein the pump is arranged in fluid communication with at least one of a fluid passageway and one or more fluid retainment regions.

A system can be provided that can comprise a fluid processing device as described herein, a power source, and at least two electrical leads forming electrical connections, respectively, between the power source and the at least two electrodes. A system can be provided that can comprise a fluid processing device as described herein, and a magnet, wherein the magnet generates a magnetic field and the fluid processing device is arranged at least partially within the magnetic field.

Exemplary devices and methods according to various embodiments are described below with reference to the drawings. The present teachings are not limited to the embodiments depicted in the drawings.

Figure 1A:
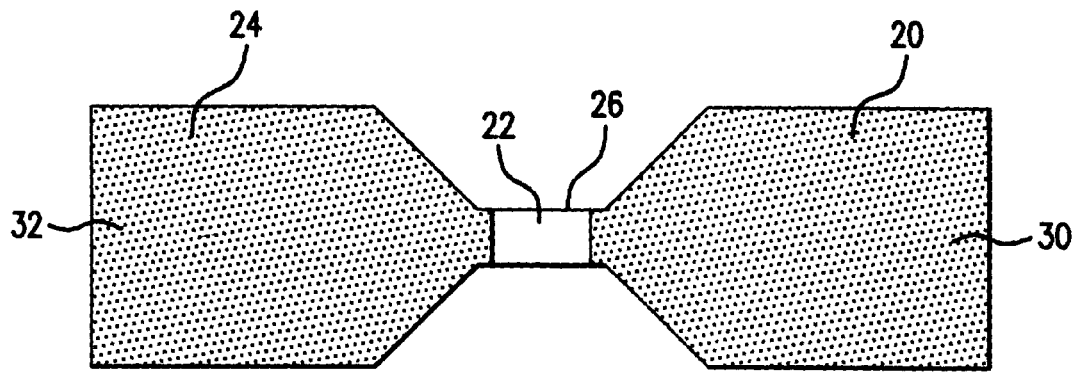
Figure 1B:
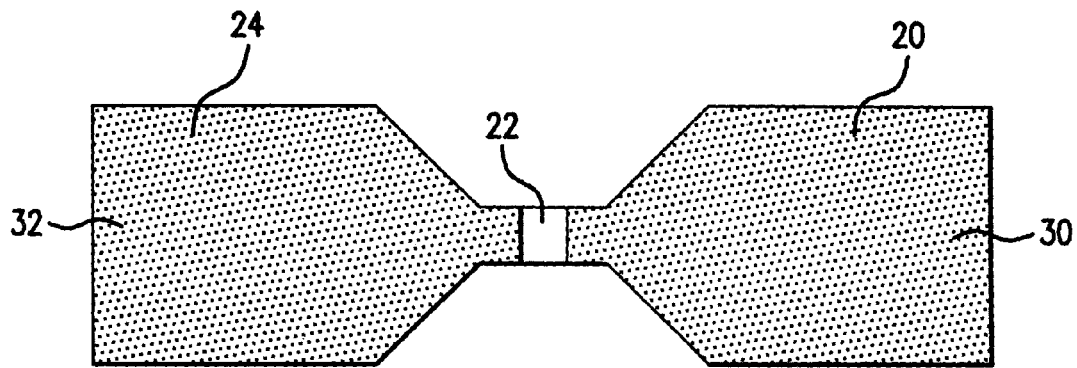
Figure 1C:
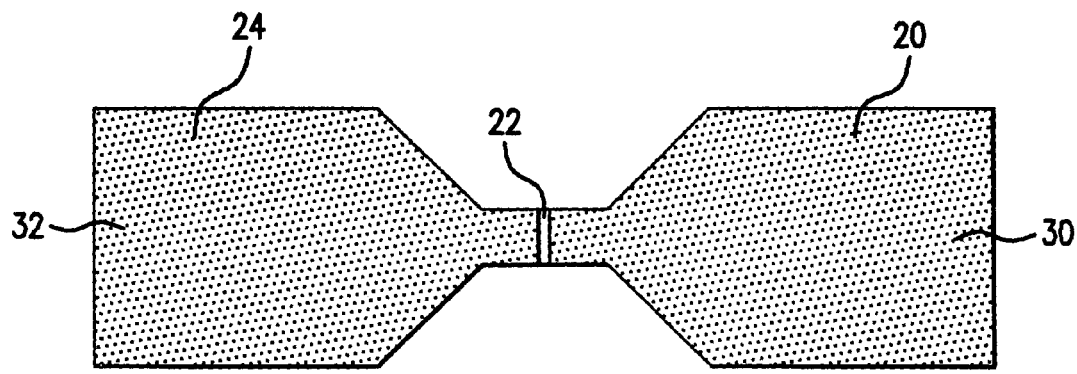

Referring to FIGS. 1(a)-1(c), a schematic illustration of the process by which a solute bridge valve establishes fluid communication between two fluid passageways, according to various embodiments, is shown. FIG. 1(a) shows two regions 20, 24 containing fluids 30, 32, respectively, with the two regions 20, 24 being interconnected through fluid passageway 26. A valve comprising a dissolvable LCST-free material, herein exemplified as solute bridge valve 22, can be provided as a plug of material that completely or partially blocks fluid passageway 26 and separates the fluids, e.g. solvents, reagents or other materials, in respective reservoirs 20, 24. In various embodiments, the device can be manufactured to provide a vacuum on one or more sides of a dissolvable valve, for example, to achieve a pressure of from about 0.01 to about 0.99 atm, or from about 0.1 to about 0.5 atm.

FIG. 1(b) shows the size of solute bridge valve 22 decreasing as the material that makes up the solute bridge valve gradually dissolves into one or both of fluids 30, 32 in regions 20, 24. FIG. 1(c) shows that fluids 30, 32 have come into contact with each other when solute bridge valve 22 has completely dissolved. The time required to completely dissolve solute bridge valve 22 can be determined by the cross-sectional area and/or shape of capillary fluid passageway 26 and the length and dissolvability of solute bridge valve 22. By controlling the material and/or size of solute bridge valve 22, it is also possible to control the length of the time elapsed before the solute bridge valve has completely dissolved to allow mixing of fluids 30, 32.

The material that makes-up solute bridge valve 22 can comprise a material that dissolves into fluids 30, 32. The material of the solute bridge valve can be compatible with the assay to be conducted, and not adversely affect the assay.

According to some embodiments, solute bridge valve 22 can be made from a material that partially or completely separates regions 20, 24 in the diagnostic device. Flow control through fluid passageway 26 can be affected by the change in the open cross-sectional area of the fluid passageway between the two regions, subsequent to the change in volume of the material. The actuation of solute bridge valve 22 can comprise the volumetric change of the material resulting from contact with the solution or solutions in regions 20, 24. A change in volume of the material can result from other characteristics of the solution or solutions, such as temperature, water content, chemical composition, electrical charge, magnetic properties, a combination thereof, or the like. If the material making up solute bridge valve 22 completely blocks fluid passageway 26, the two regions 20, 24 can be completely separated when the valve is in a non-dissolved, closed state.

FIG. 2 illustrates an embodiment of an assay device that uses capillary driven flow and solute bridge valves to control a specific sequence of fluid actuation steps. The device shown in FIG. 2 can be constructed as a microfluidic chip manufactured using microfabrication techniques. According to various embodiments, the chip can comprise a set of regions and fluid passageways, for example, microchannels for retaining different components, for example solids and/or liquids such as reagents, components, samples, etc., and for processing such components, for example, for one or more of mixing, reacting, incubating, purifying, washing, storing, or the like, the various components. FIG. 2 illustrates a device according to some embodiments having sample region 90 connected through fluid passageway 80 to reaction region 48. An intermediate region or regions can be connected through fluid passageway 170 containing valve 70 to reaction region 48. A second intermediate region 46 can be connected through fluid passageway 172 containing valve 72 to reaction region 48. A first reagent region 40 for containing unreacted reagents 120 can be connected through fluid passageway 160 containing valve 60 to one intermediate region 44, while a second reagent region 42 containing unreacted reagents 124 can be connected through fluid passageway 162 containing valve 62 to second intermediate region 46. The reaction region 48 can be connected through fluid passageway 174 containing valve 74 to first waste region 50. The waste region 50 can also be connected, through another fluid passageway 176 containing valve 76, to second waste region 52.

Reagent regions 40, 42 can be selectively separated from intermediate regions 44, 46 by pressure-actuated valves 60, 62 placed within fluid passageways 160, 162. According to some embodiments, pressure-actuated valves 60, 62 within fluid passageways 160, 162 can be diaphragms that are burstable upon pressure being applied to reagent regions 40, 42.

Intermediate regions 44, 46 can be in turn connected through fluid passageways 170, 172 containing valves 70, 72 to the reaction region 48. Fluid communication through fluid passageways 170, 172 containing valves 70, 72 can be controlled by the fluid cross-sectional area of the fluid passageways 170, 172 as well as the positioning of solute bridge valves 70, 72 as discussed above, within fluid passageways 170, 172. Solute bridge valves 70, 72 contained within fluid passageways 170, 172 can provide automatic control of the fluid communication between intermediate regions 44, 46 and reaction region 48 as a result of their responsiveness to stimuli such as the chemical composition of the fluids within regions 44, 46 and within reaction region 48. Each of regions 90, 48, 40, 42, 50, and 52, can optionally comprise a vent 91, 49, 41, 43, 51, and 53, respectively.

FIG. 3 illustrates an embodiment wherein the regions and channels are arranged such that solute bridge valves 70a, 72a, 74a, 76a corresponding to solute bridge valves 70, 72, 74, 76 of the embodiment shown in FIG. 2, are arranged in a line for ease of manufacture. Each of regions 90a, 48a, 40a, 42a, 50a, and 52a, can optionally comprise a vent 91a, 49a, 41a, 43a, 51a, and 53a, respectively.

FIGS. 4A-4J illustrate a sequence of events that can occur during operation of a diagnostic device according to some embodiments, such as exemplified in FIG. 2. FIGS. 4A-4J are explained in greater detail below. Each of regions 90, 48, 40, 42, 50, and 52, can optionally comprise a vent 91, 49, 41, 43, 51, and 53, respectively.

FIGS. 5A-5J illustrate a sequence of events that can occur during operation of a diagnostic device according to some embodiments, such as exemplified in FIG. 3. FIGS. 5A-5J are explained in greater detail below. Each of regions 90a, 48a, 40a, 42a, 50a, and 52a, can optionally comprise a vent 91a, 49a, 41a, 43a, 51a, and 53a, respectively.

Figure 4A:
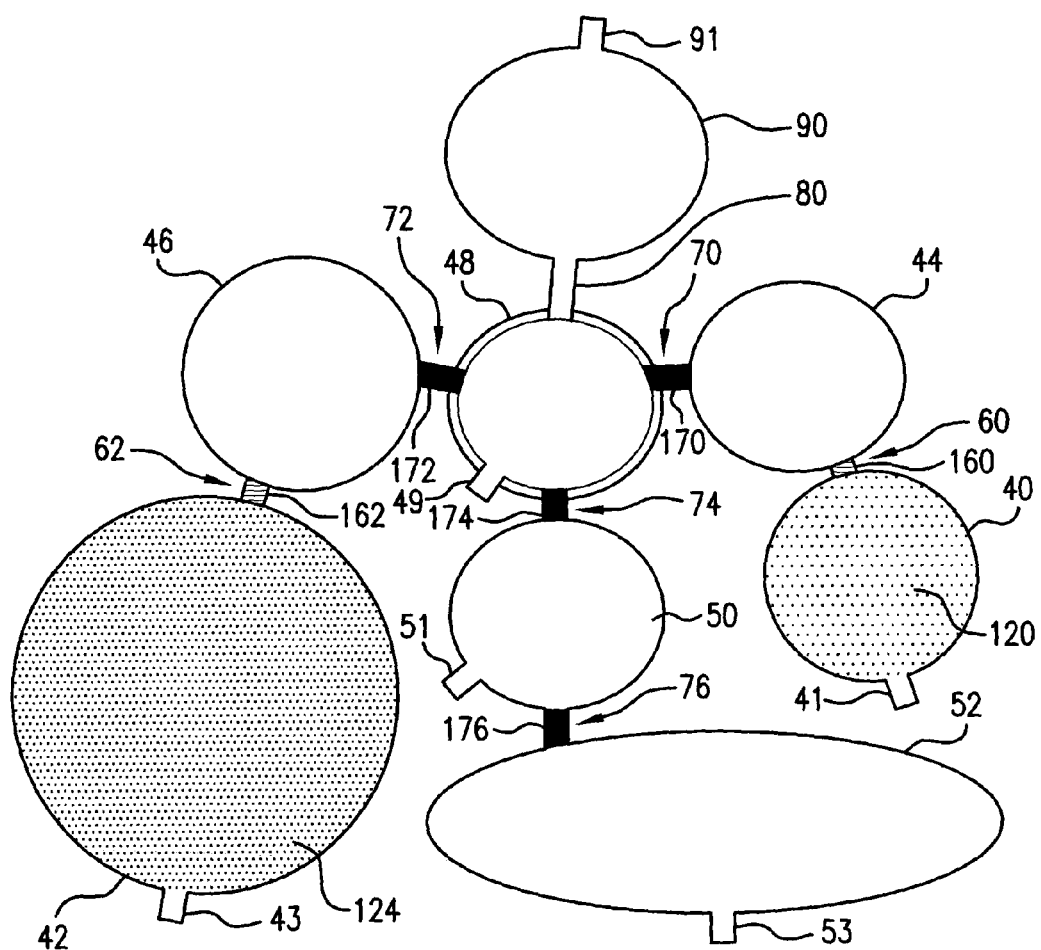

In FIG. 4A a diagnostic device according to various embodiments is provided with regions 40, 42 that can be pre-loaded with, for example, a wash buffer 124 in region 42 and a detection reagent 120 within region 40. Pressure-actuated valves 60, 62, for example, a burstable or tearable diaphragm, can be provided within fluid passageways 160, 162 separating regions 40, 42 from intermediate regions 44, 46.

Figure 4B:
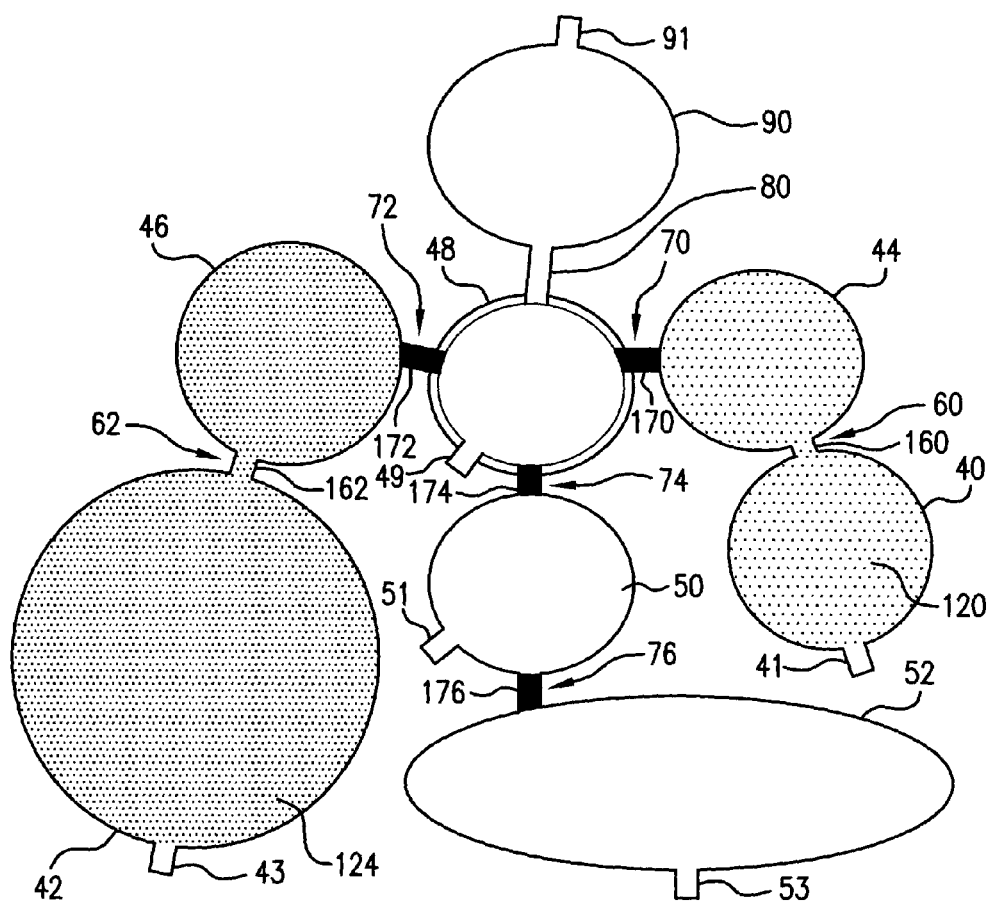

In FIG. 4B a user can apply pressure to the regions 40, 42, thereby actuating or bursting valves 60, 62 within fluid passageways 160, 162. Bursting valves 60, 62 can cause a flow of the buffers and/or reagents within regions 40, 42 into intermediate regions 44, 46.

Figure 4C:
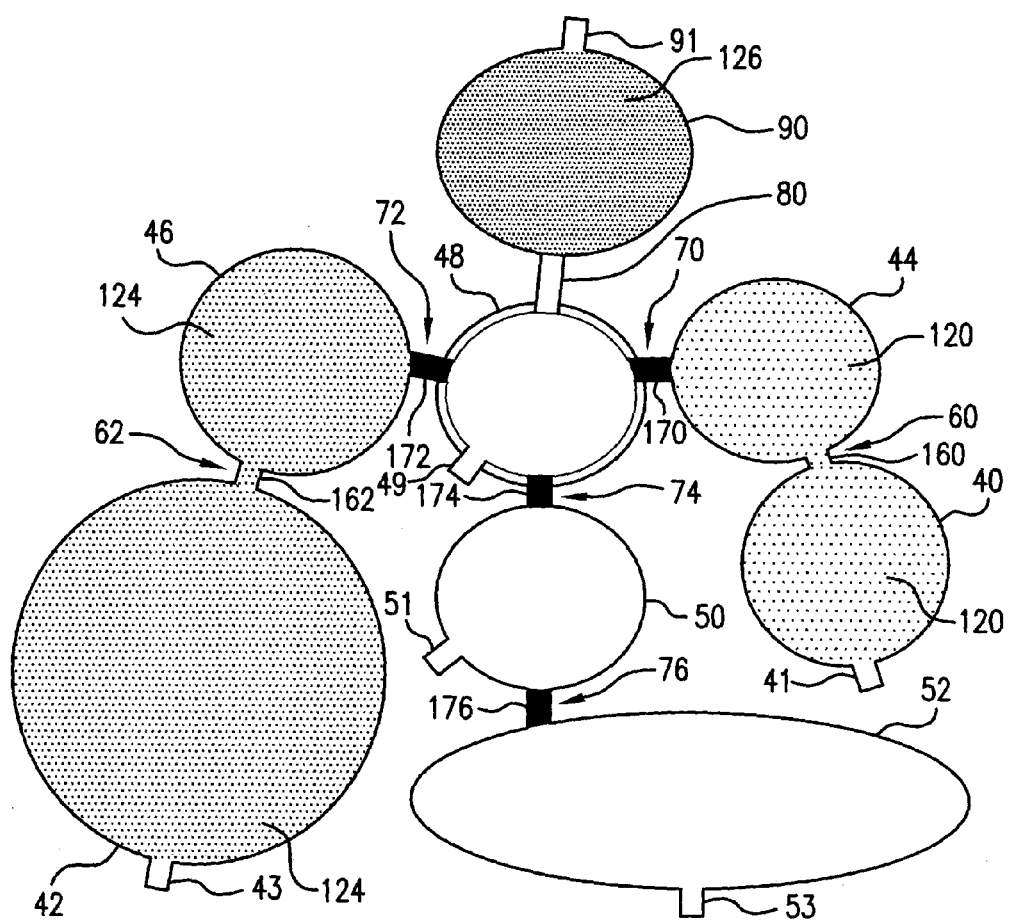

As shown in FIG. 4C a user can then inject sample 126 into sample region 90, which is connected to reaction region 48, that can contain solid ingredients, through fluid passageway 80. Sample injection could alternatively occur before or at the same time as bursting the valves. Sample injection can be performed, for example, by piercing a cover layer or through a septum (not shown). Fluid passageways 170, 172 and 80 can be provided with fluid flow modulators, exemplified below with reference to a solute bridge valve, such as a plug of material that can change volume when exposed to certain stimuli. The solute bridge valves can control the fluid communication between intermediate regions 44, 46 and reaction region 48, as well as the fluid communication between sample region 90 and reaction region 48. Fluid flow of the sample from sample region 90 into reaction region 48 can also be automatically controlled as a result of the dimensions of fluid passageway 80. For example, fluid passageway 80 can be provided as a capillary passageway such that the sample material from sample region 90 gradually wicks into reaction region 48, without the need for a solute bridge valve to control flow through fluid passageway 80. Pressure can be relieved or equalized via vent 91 and/or 49.

Figure 4D:
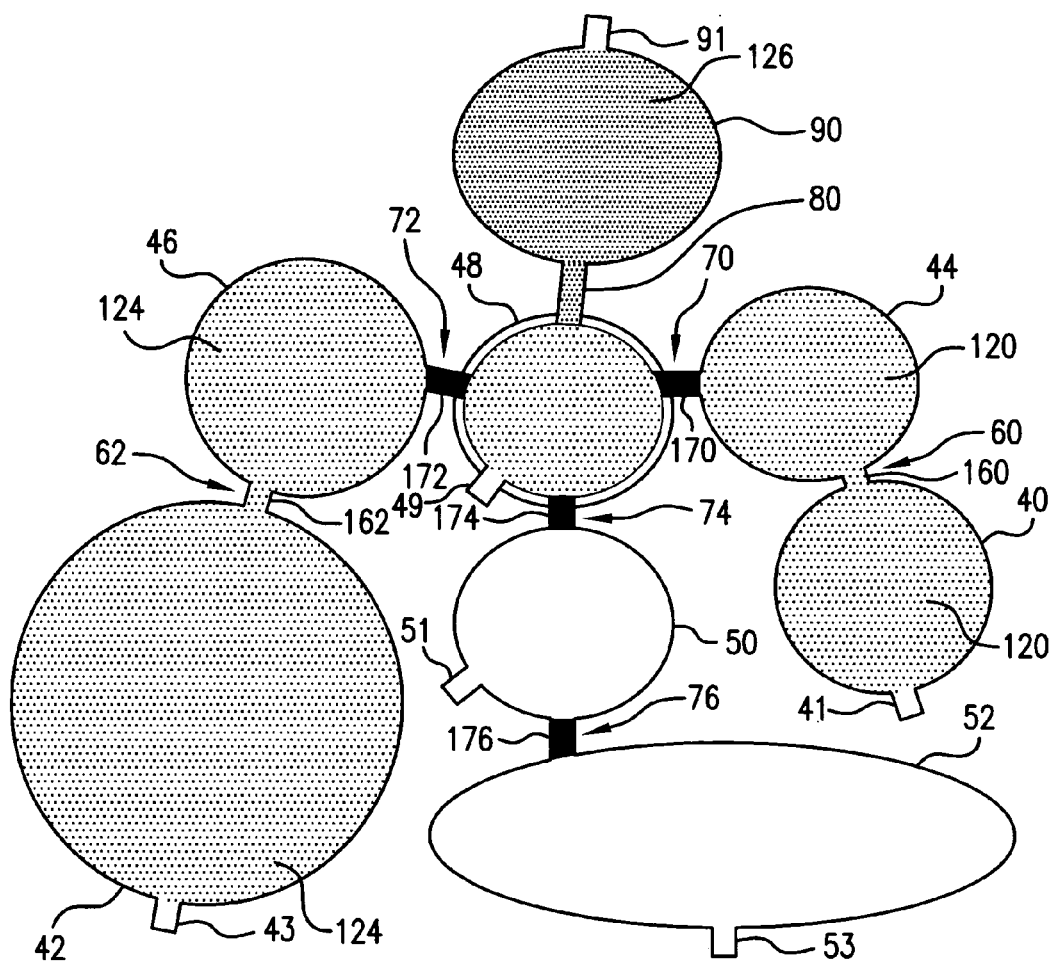
Figure 4E:
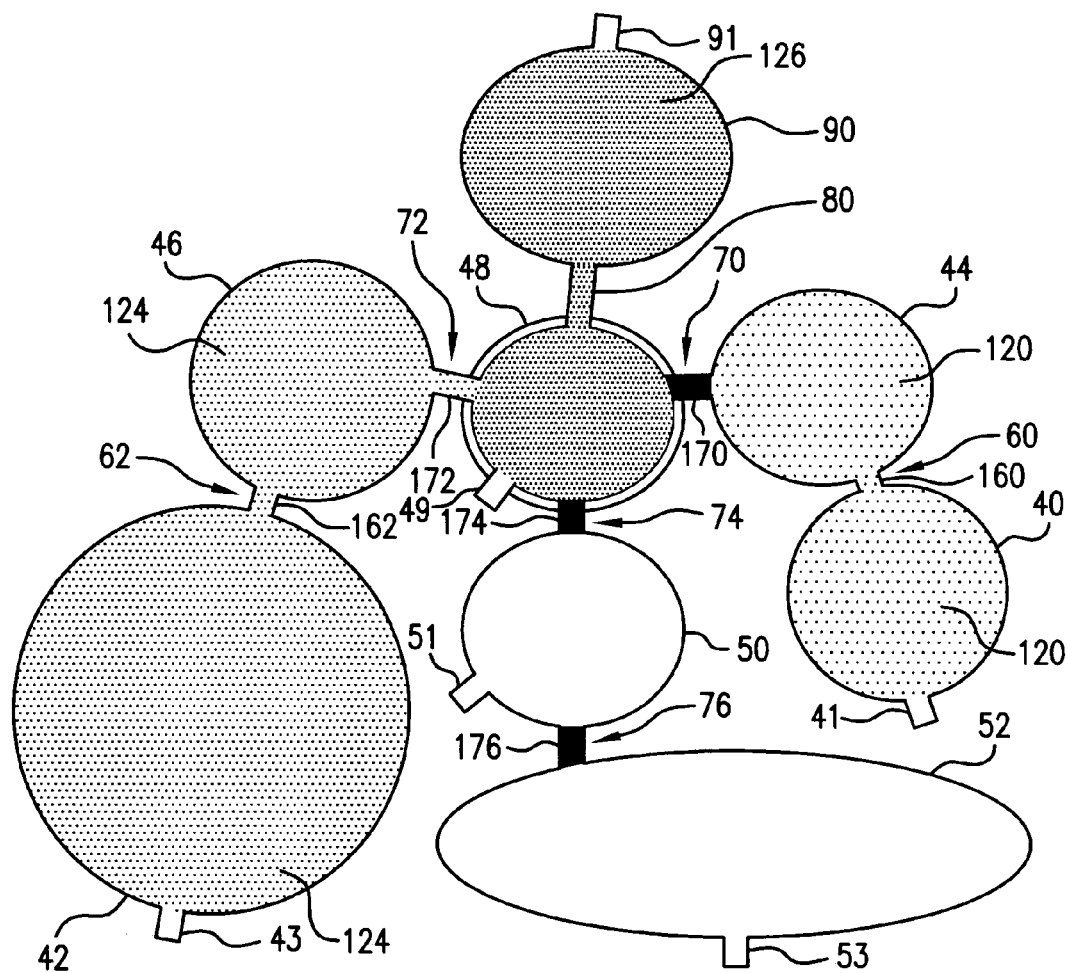

As shown in FIG. 4D, the sample material that is now in reaction region 48 can contact solute bridge valve 72 on one side of valve 72 in fluid passageway 172, while the reagent in intermediate region 46 can contact solute bridge valve 72 from the opposite side of the valve. One or more of the reagents in region 46 and/or the sample in reaction region 48 begin to dissolve or otherwise affect the volume of the material making up solute bridge valve 72. After a certain amount of time that is automatically controlled by at least one of the flow cross-section of fluid passageway 172, or the volume or composition of material at least partially making-up solute bridge valve 72, solute bridge valve 72 no longer prevents the reagent in region 46 from gradually diffusing into sample 126 in reaction region 48, as shown in FIG. 4E. Pressure can be relieved and/or equalized via vent 43.

Figure 4F:
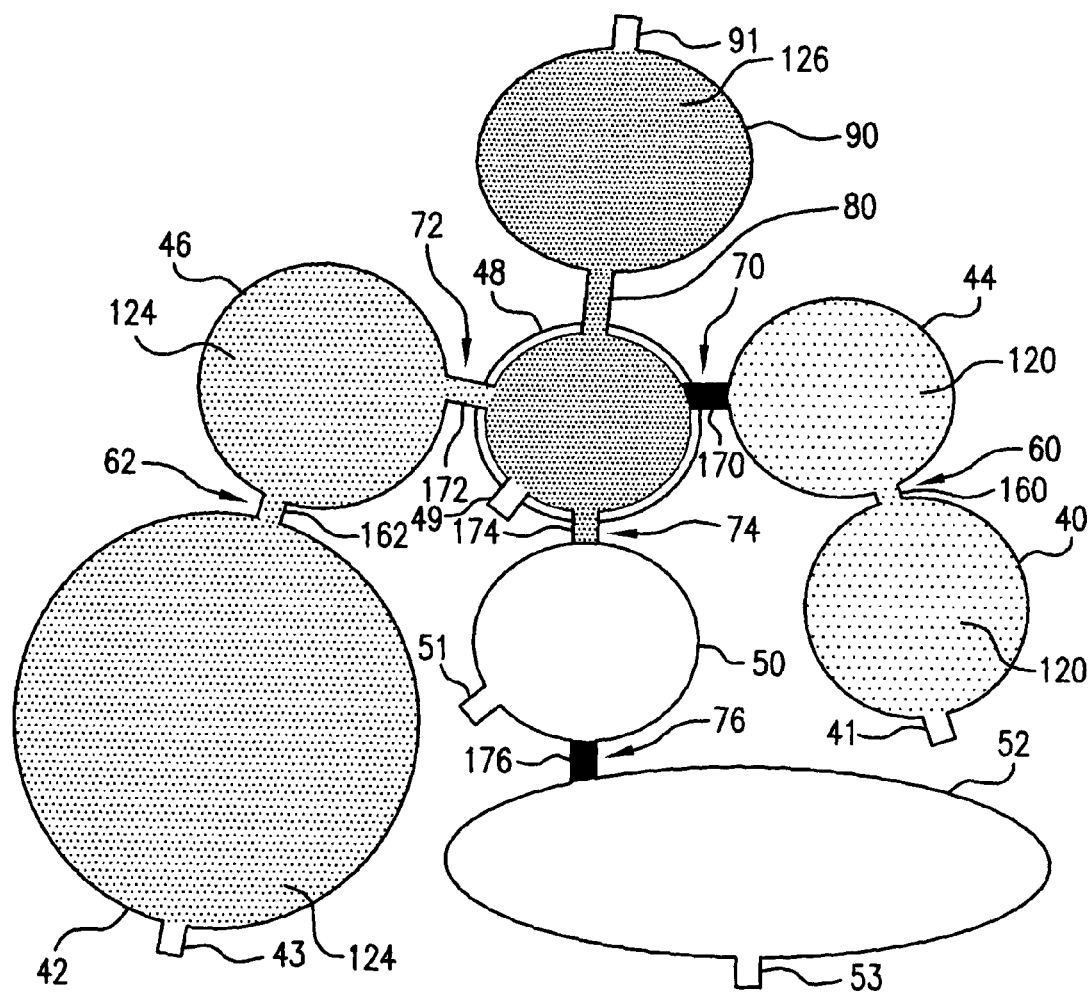
Figure 4G:
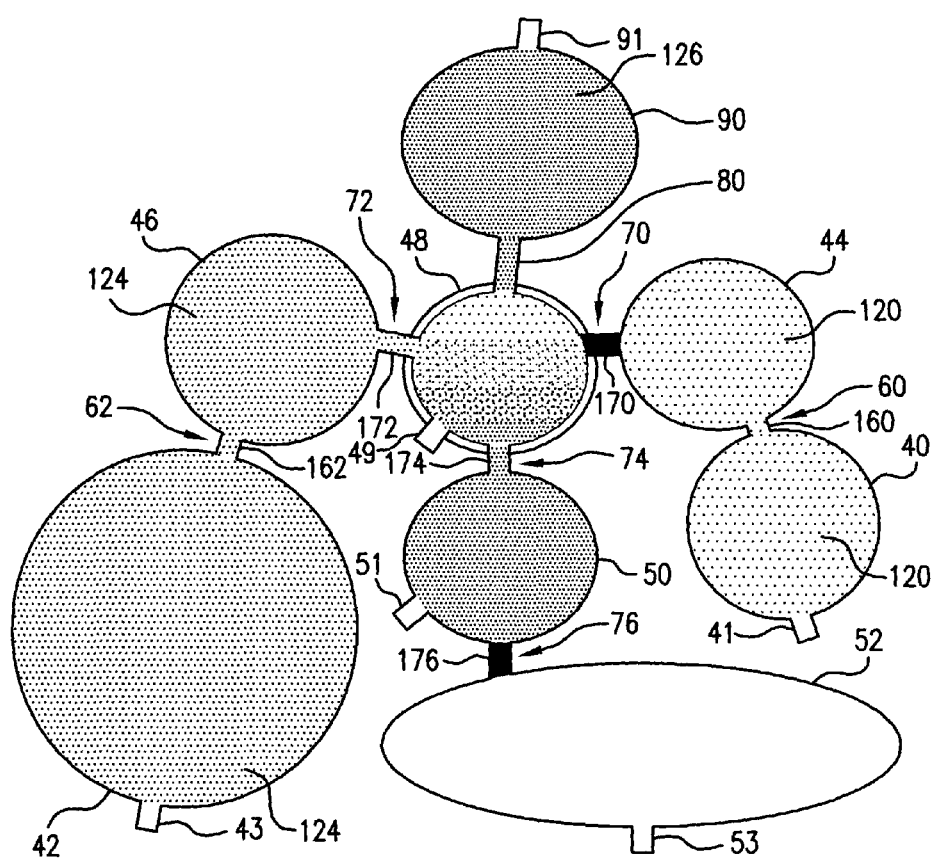

The fluid passageway 174 leading from reaction region 48 into waste region 50 can also be provided with dimensions that allow for capillary action, and a solute bridge valve 74 that will gradually dissolve or otherwise change volume as a result of contact with the fluid from reaction region 48. As shown in FIG. 4F, the effect of the fluid within reaction region 48 on solute bridge valve 74 within fluid passageway 174 gradually opens fluid passageway 174 within which valve 74 is positioned to allow fluid communication between the reaction region 48 and first waste region 50. The flow of fluid from reaction region 48 into waste region 50 through fluid passageway 174 contributes to a capillary flow of more reagent from reagent region 42 through fluid passageway 162 and intermediate region 46 into reaction region 48. Pressure resulting from such flow can be relieved via vent 43 and/or vent 49. Flow of fluid from reaction region 48 into waste region 50, as shown in FIG. 4G, can also cause more of sample 126 to flow from sample region 90 into reaction region 48. Pressure resulting from the flow of fluid from reaction region 48 into waste region 50, can be relieved via vent 49 and/or vent 51. According to some embodiments, the relative dimensions of the fluid passageways such as fluid passageway 80 leading from sample region 90 into reaction region 48, and fluid passageway 172 within which valve 72 is positioned leading from intermediate region 46 into reaction region 48, can be selected in order to contribute to a preferential flow of fluid from intermediate region 46 into reaction region 48. A smaller flow cross-section through fluid passageway 80 than the flow cross-section through fluid passageway 172 would result in more fluid flowing from reagent region 42 and intermediate region 46 into reaction region 48 than the amount of sample flowing from sample region 90 into reaction region 48.

Figure 4H:
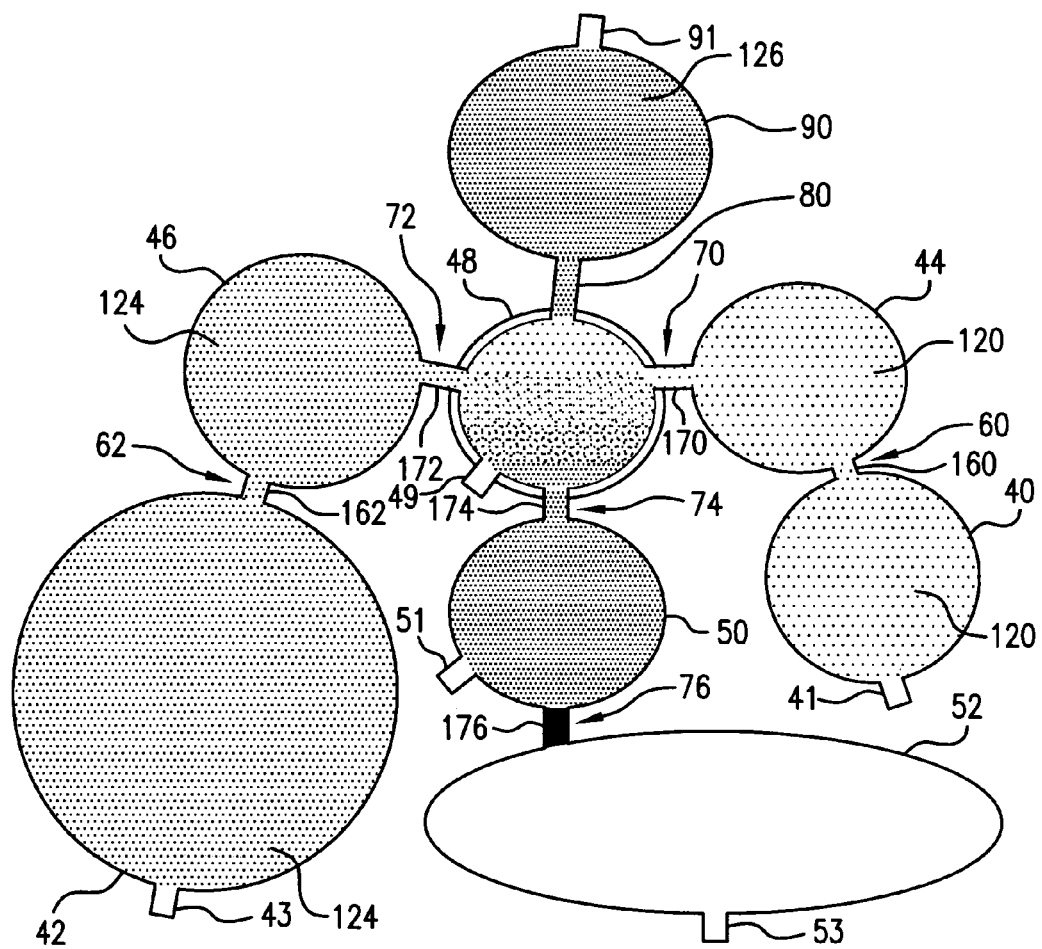
Figure 41:
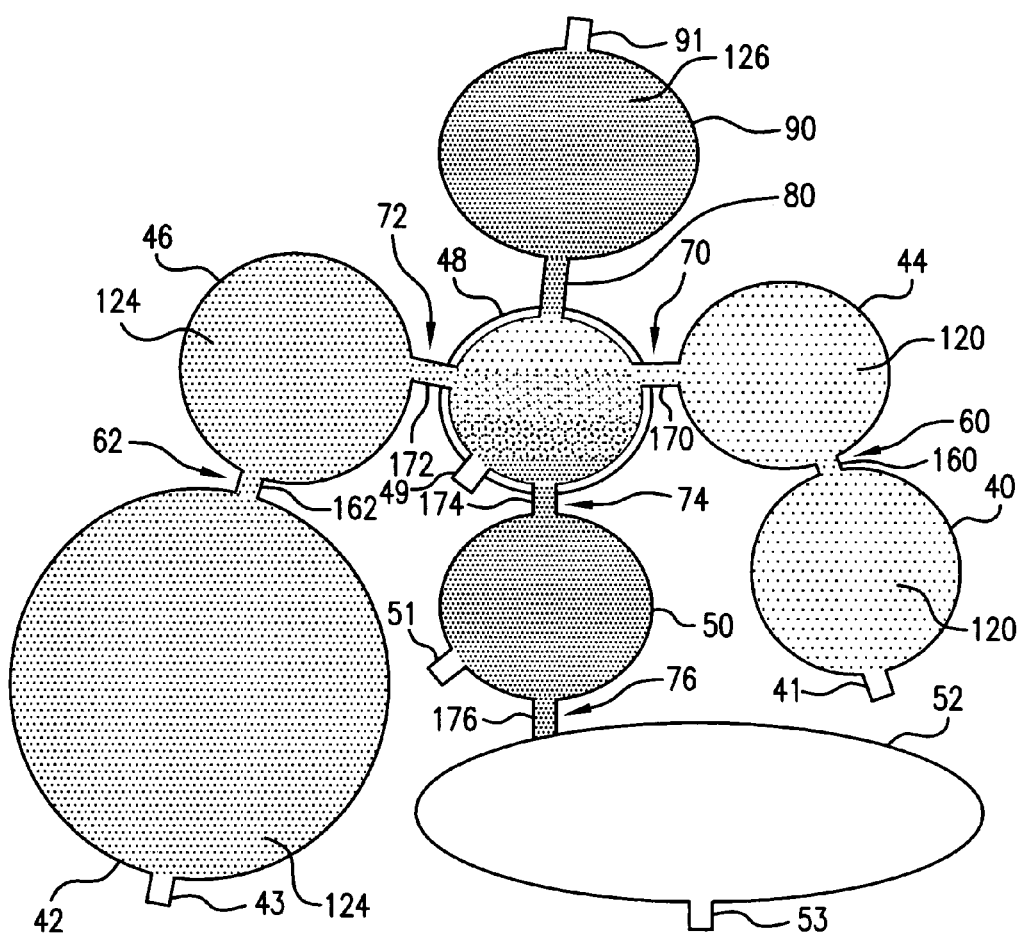

After a predetermined amount of time, solute bridge valve 70 provided in fluid passageway 170 between intermediate region 44 and reaction region 48 can also begin to dissolve, melt, or otherwise change in volume such that reagent 120 flows from reagent region 40 through intermediate region 44 and into reaction region 48, as shown in FIG. 4H. Pressure resulting from such flow can be relieved via vent 41 and/or vent 49. The relative cross-sectional flow areas of the various fluid passageways connecting regions as well as the amount of material provided in the solute bridge valves within the flow passages can be varied in order to control the amount of time it takes for the reagents and other fluids within the regions to move from one region to the next, thereby providing a control of the fluid handling steps.

Figure 4J:
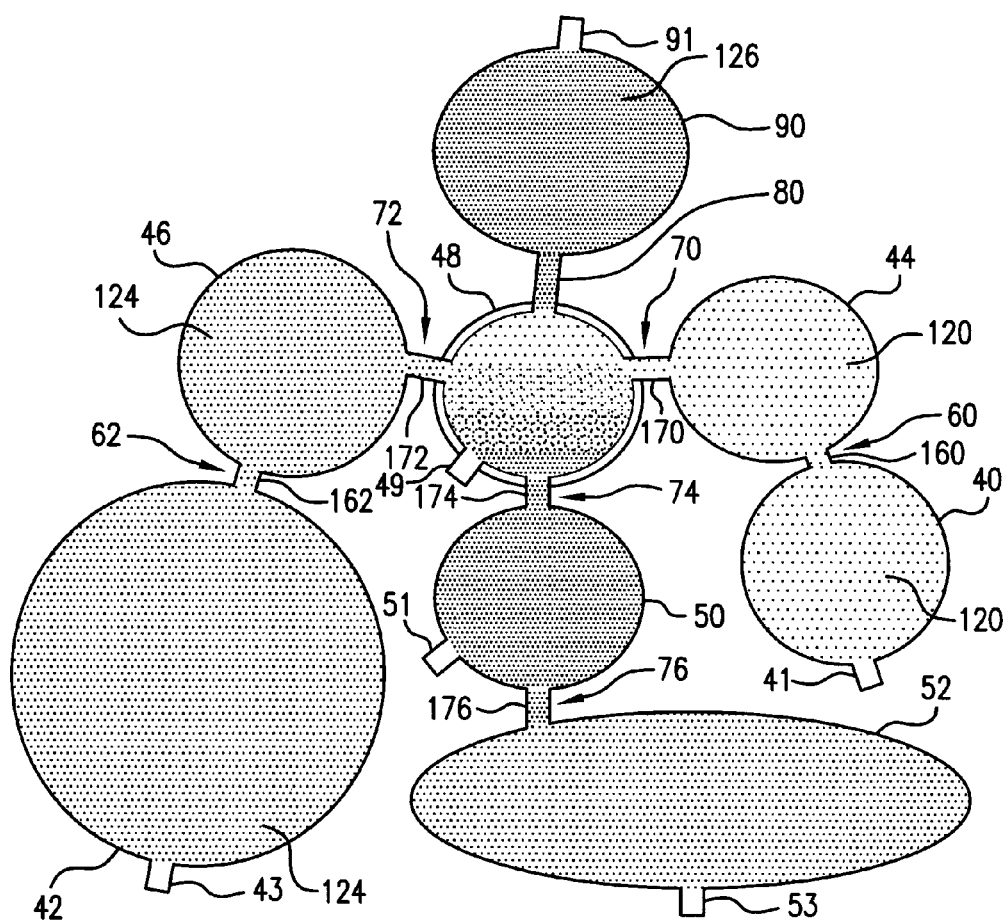

After more time has passed, solute bridge valve 76 in fluid passageway 176 leading to second waste region 52 can begin to dissolve, melt, or otherwise change in volume such that fluid can flow from waste region 50 into second waste region 52, as shown in FIGS. 4I and 4J. Pressure can be relieved via vent 51 and/or vent 53. This flow can cause more of the reagents and sample to flow from regions 44, 46 and 90 into reaction region 48. Pressure can be relieved via vent 49 and/or vent 91.

In an alternative embodiment, as exemplified in FIG. 3 and FIGS. 5A-5J, the diagnostic device can comprise a set of reservoirs and fluid passageways, for example, microchannels corresponding to the regions and microchannels of the embodiment exemplified in FIGS. 2 and 4A-4J, but with the solute bridge valves 72a, 70a, 74a, and 76a being aligned so that they can be formed as a single, extended length of solute bridge valve material. The length of the solute bridge valve material can include different portions of different respective composition. The process by which mixing of buffer and/or reagent from regions 40a, 42a, and sample from sample region 90a is controlled automatically corresponds with the process described above for the embodiment shown in FIG. 2 and FIGS. 4A-4J.

Figure 5A:
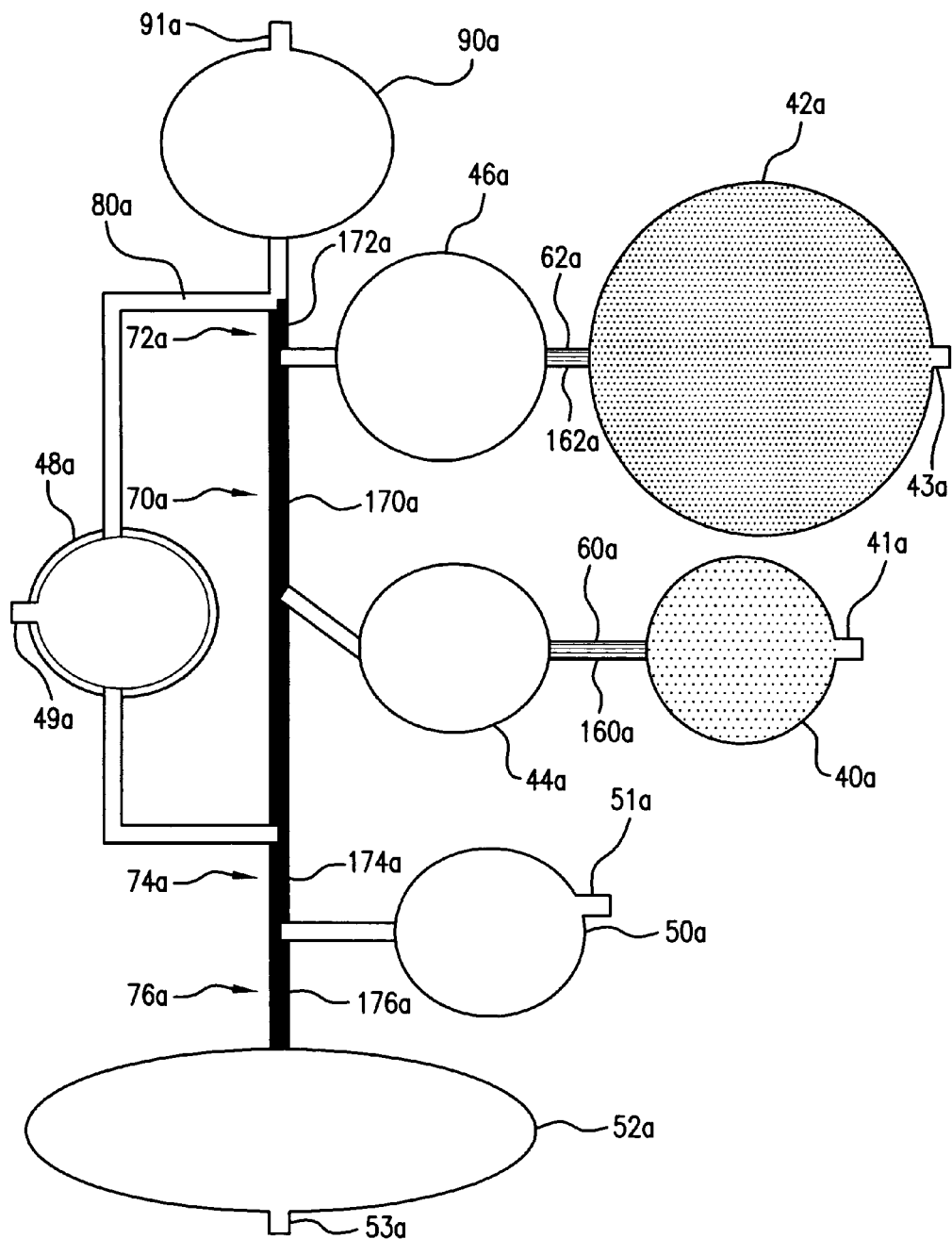
Figure 5B:
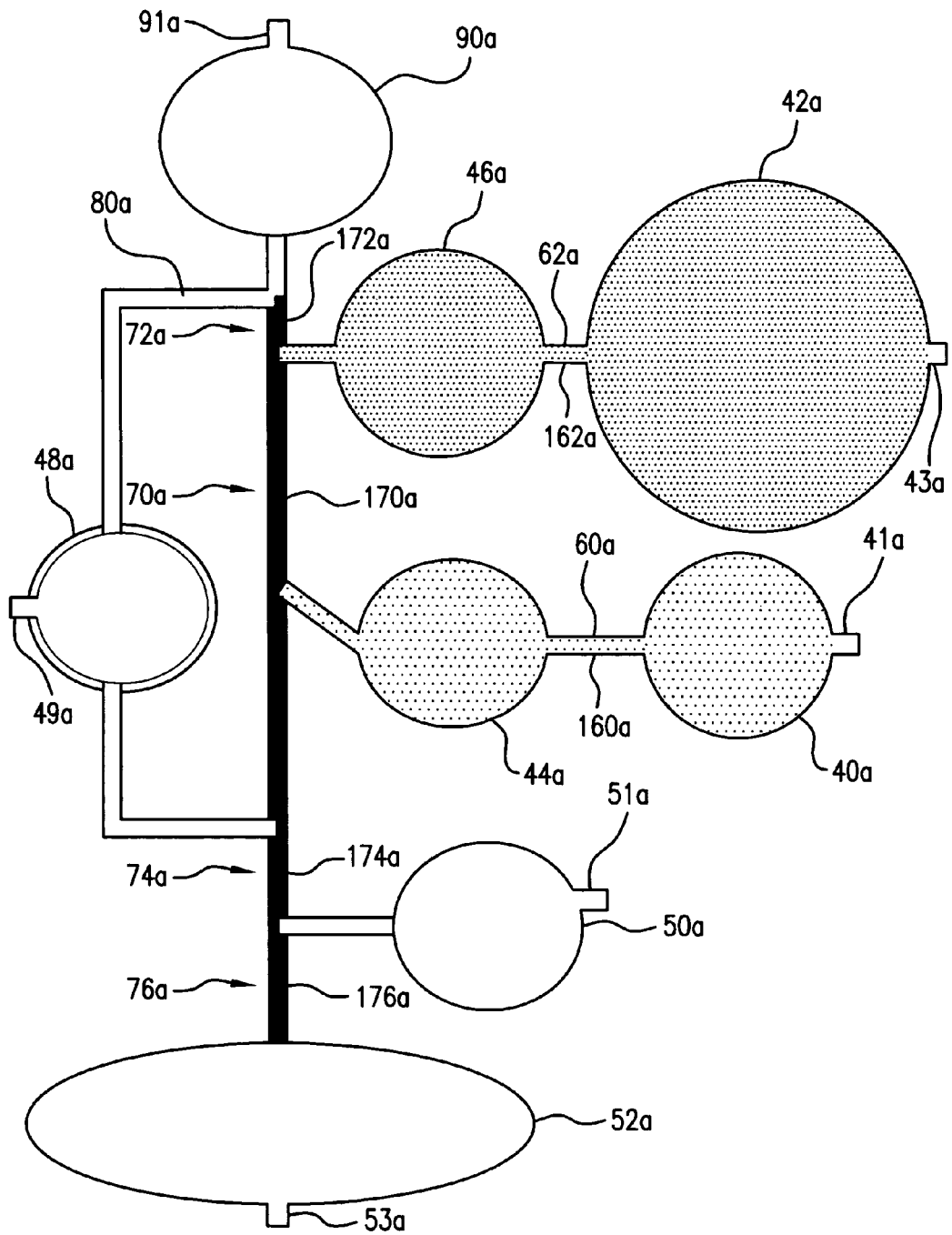
Figure 5C:
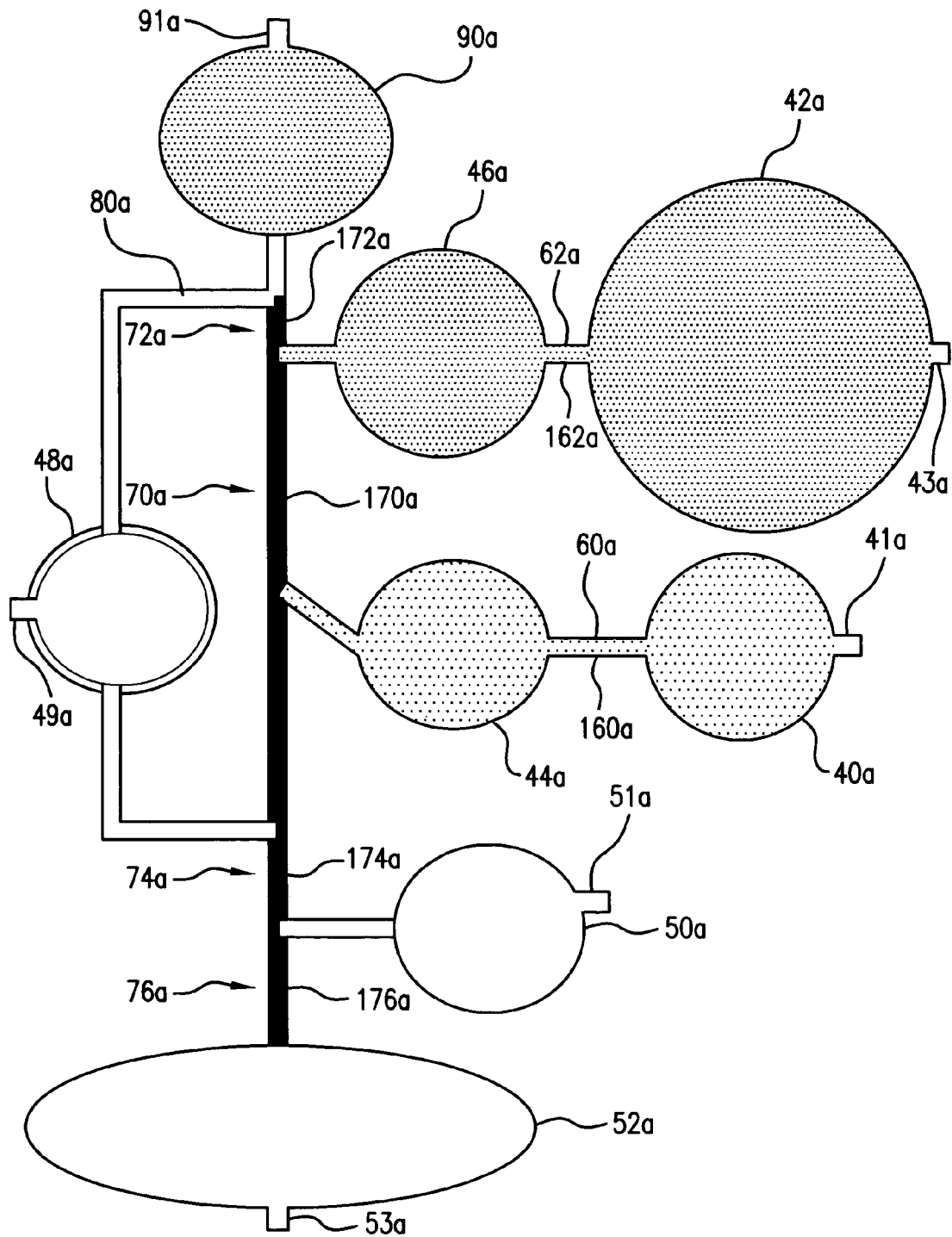
Figure 5D:
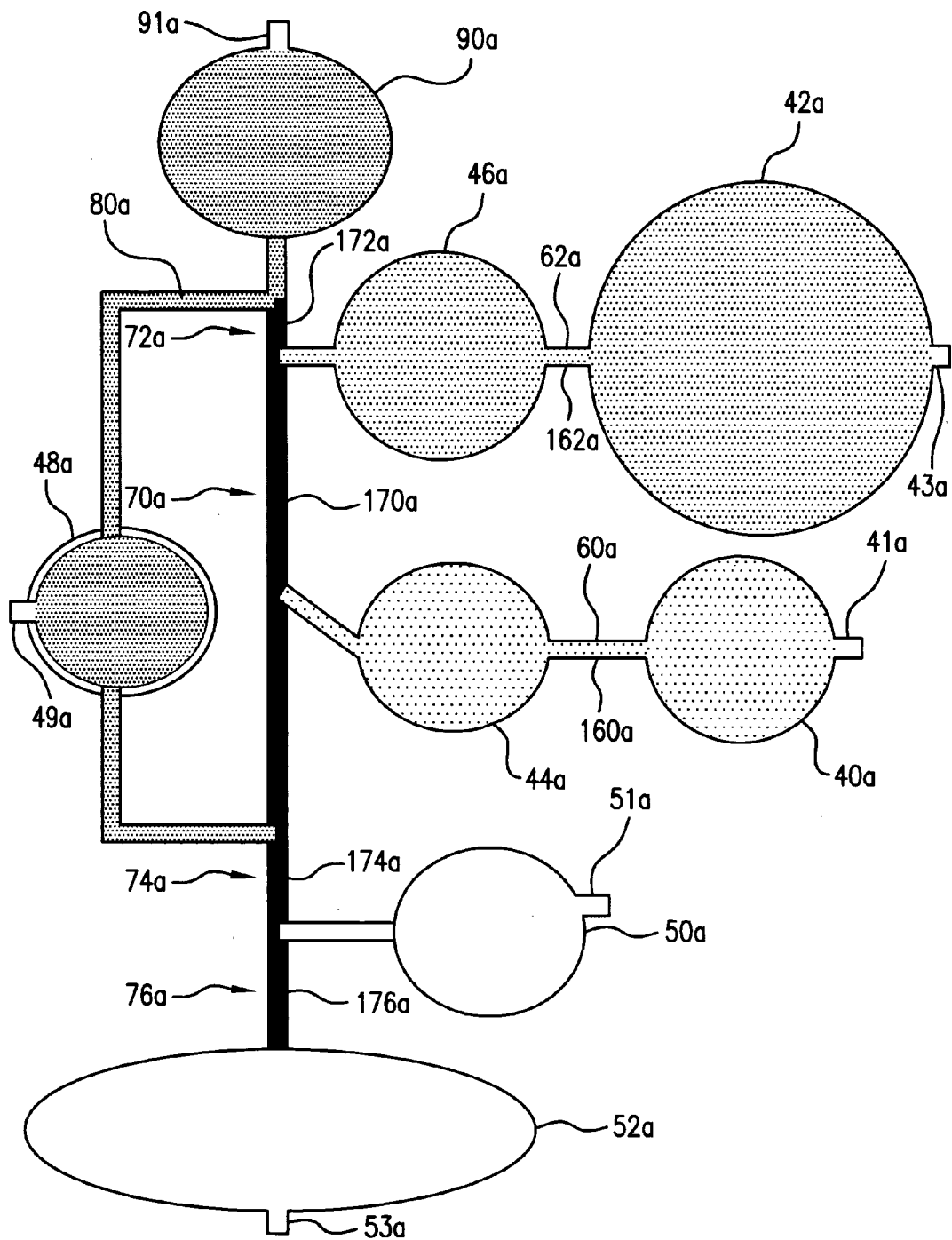
Figure 5E:
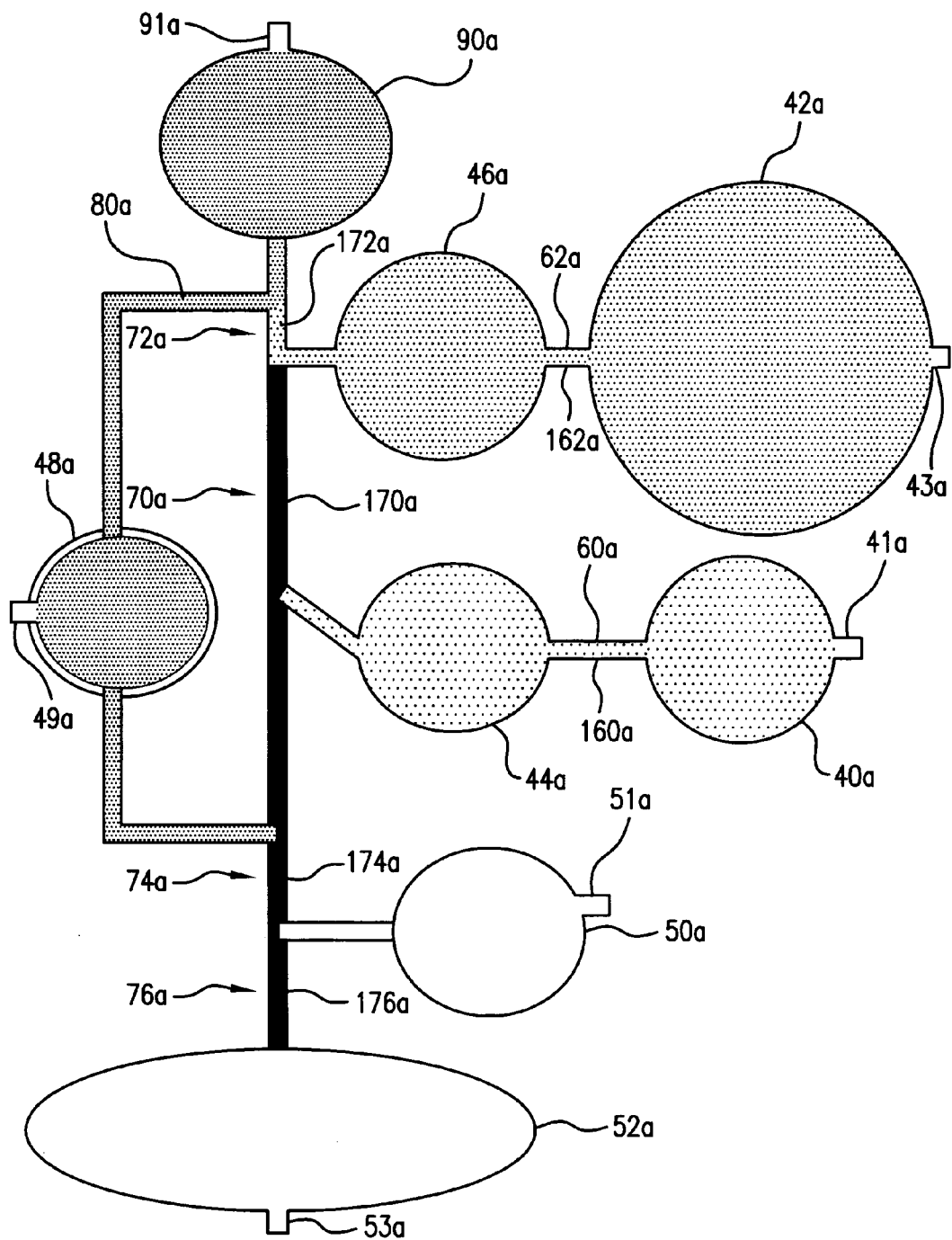
Figure 5F:
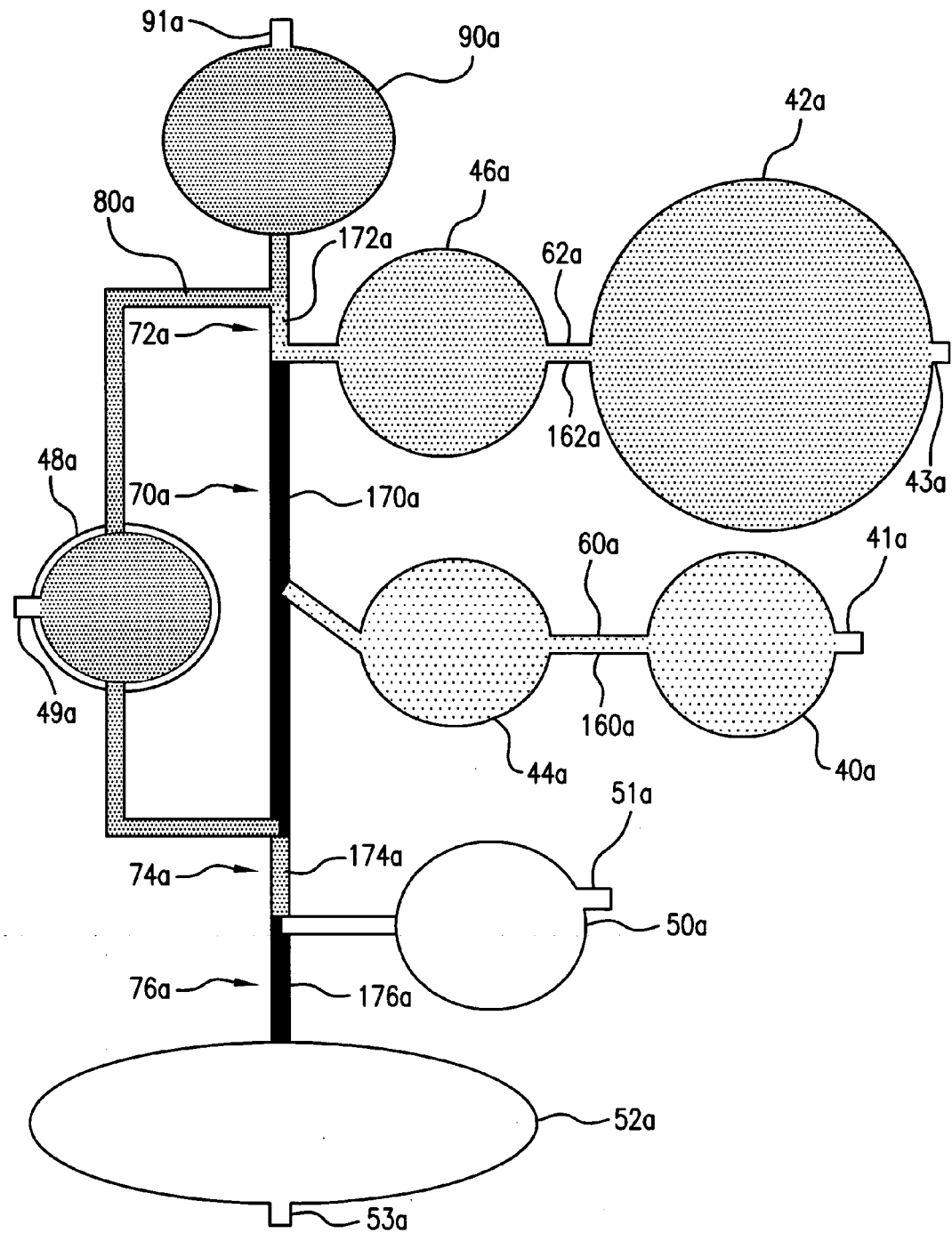
Figure 5G:
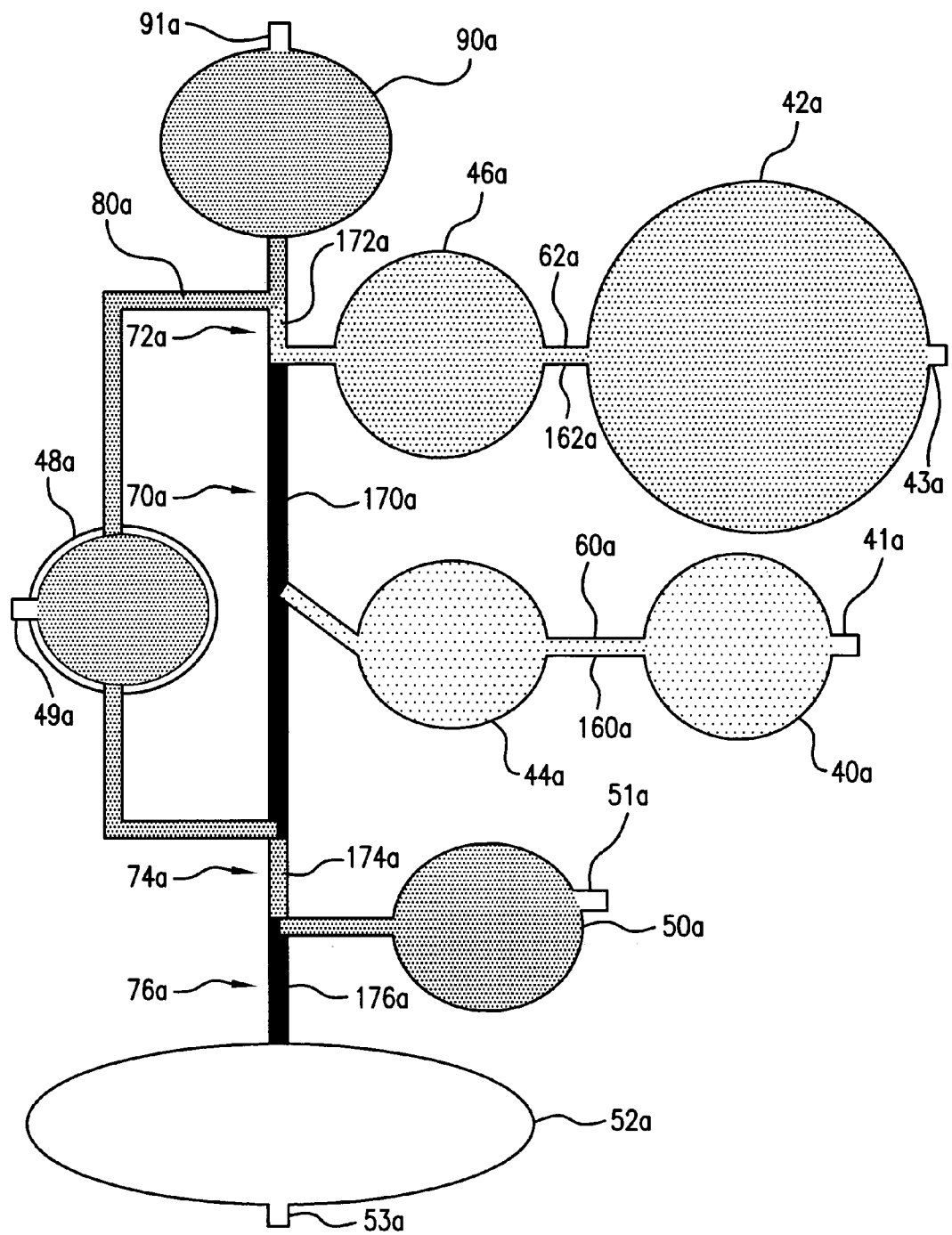
Figure 5H:
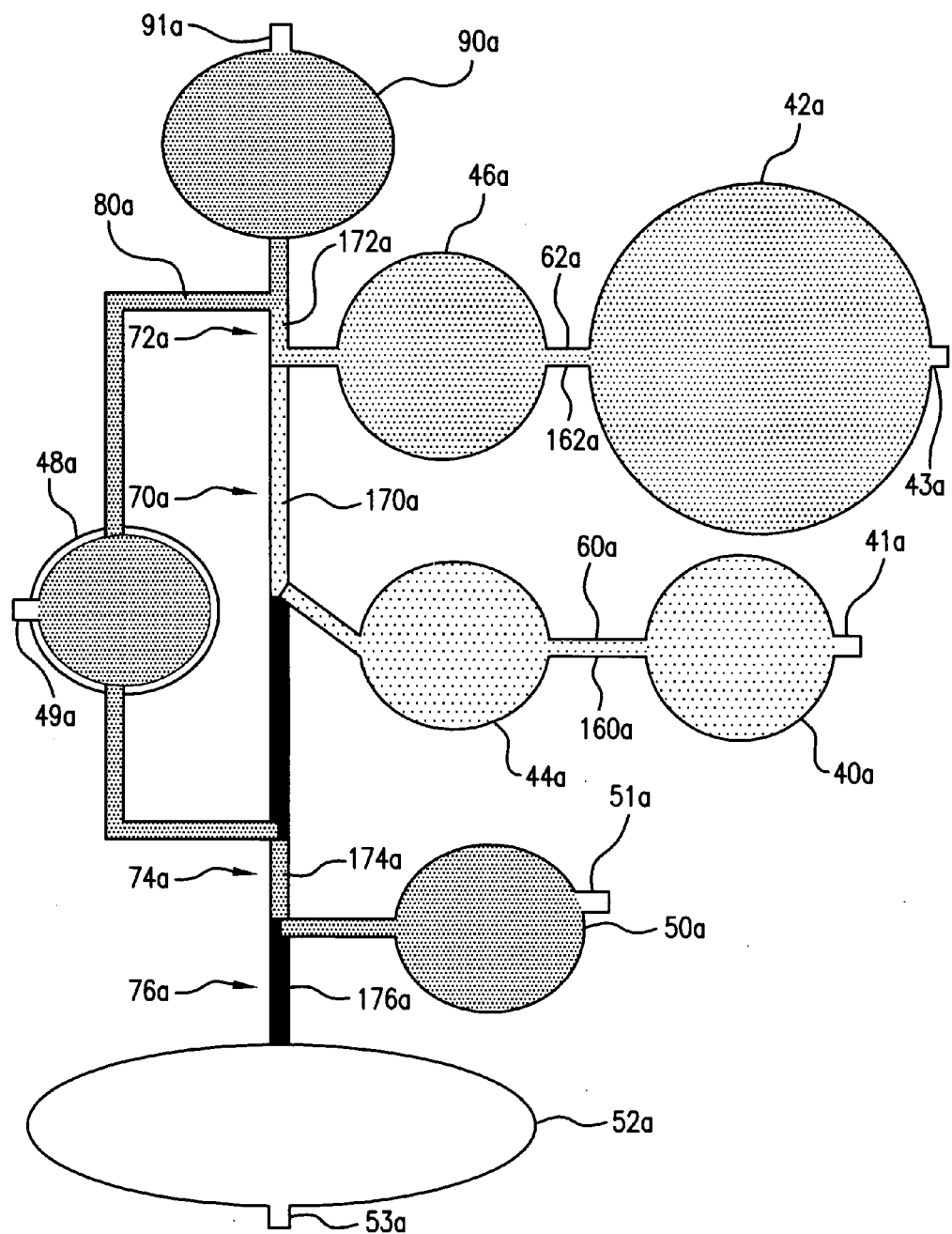
Figure 5I:
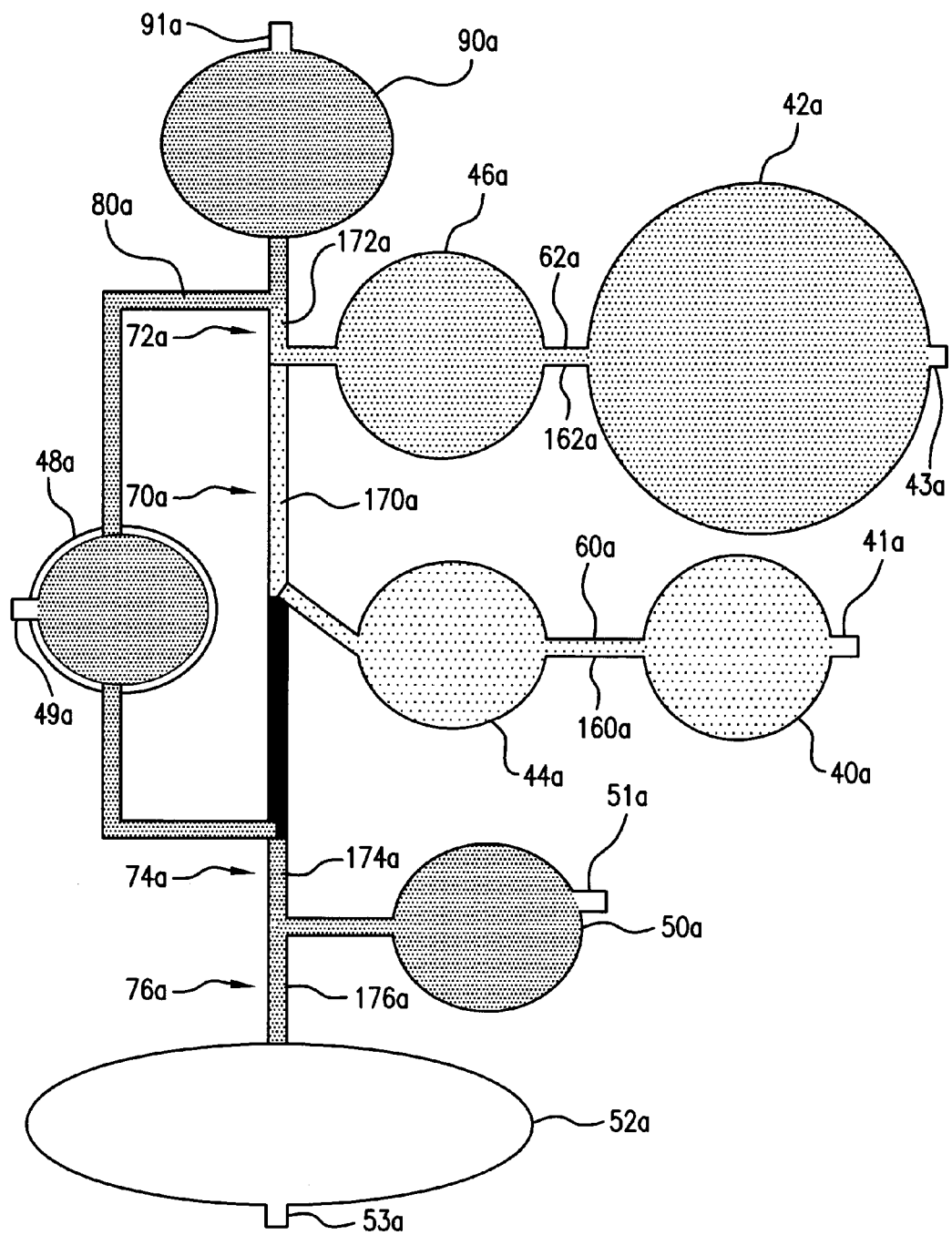
Figure 5J:
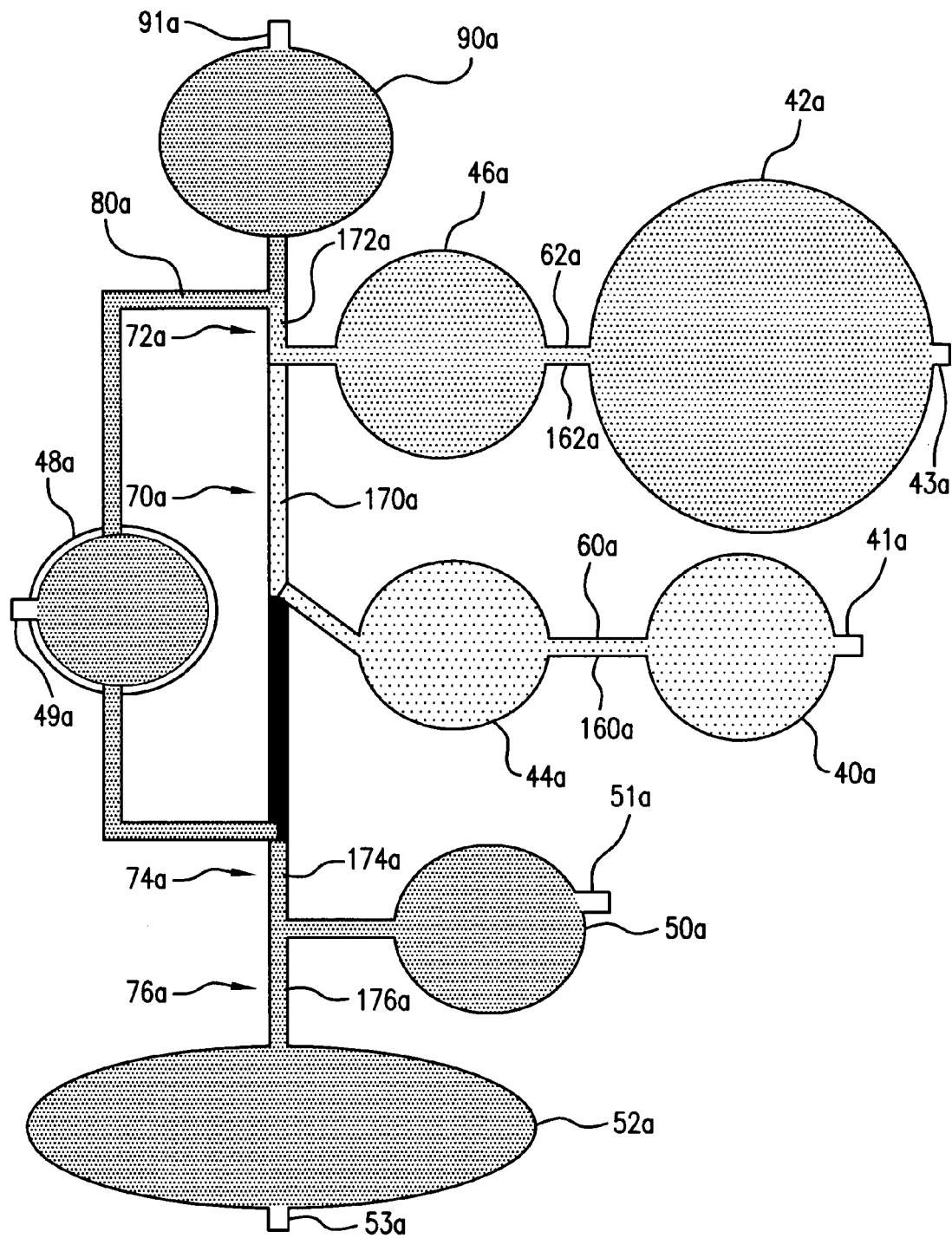

A sample solution can be added to sample region 90a, and supplied to reaction region 48a, that can contain solid ingredients, through capillary fluid passageway 80a, as shown in FIGS. 5C and 5D. Solutions, such as reagents and/or wash buffers, can be dispensed from regions 40a, 42a by pressing on the clear layer of film or other flexible covering over the regions to cause pressure-actuated valves 60a, 62a in fluid passageways 160a, 162a to burst and allow the solutions to move into intermediate regions 44a, 46a. Pressure can be relieved via vents 41a and 43a. Solution from intermediate region 46a can then begin to act on solute bridge valve 72a in fluid passageway 172a, opening up a passageway for the solution to enter passageway 80a and reaction region 48a, as shown in FIGS. 5D, 5E, 5F and 5G. FIG. 5H illustrates solution from region 44a dissolving, or otherwise reducing the volume of solute bridge valve 70a in fluid passageway 170a. Solute bridge valve 74a in fluid passageway 174a has also dissolved in FIG. 5H to allow solution from reaction region 48a to pass to waste region 50a. As described above with regard to the embodiment of FIG. 2, the flow of solution from reaction region 48a to waste region 50a can create a suction that can draw more solution from region 46a through fluid passageway 172a and capillary fluid passageway 80a into the reaction region 48a, as shown in FIG. 5I. Solute bridge valve 76a in fluid passageway 176a then dissolves, allowing solution to flow to waste region 52a, and can create suction that can draw solution from region 44a into reaction region 48a, as well as drawing additional solution from region 46a and additional sample from region 90a, as shown in FIG. 5J. For example, vents 41 and 43 are needed in 40 and 42, respectively, (FIG. 4A) in order to allow 120 and 124 to flow into 44 and 46, respectively. Likewise, vent 91 is needed in communication with region 90. A vent 49 can be provided in communication with regions 48 (FIG. 4D) such that 120, 124 and 126 can flow into it. Without a vent, the air trapped in 48 can prevent any inflow of liquid. The same can apply to regions 50 and 52.

The arrangement of regions, fluid passageways and valves of the various embodiments exemplified in FIG. 3 provides for ease of manufacturing. As shown in FIG. 3 and FIGS. 5A-5J, solute bridge valves 70a, 72a, 74a, and 76a can be aligned with each other such that the solute bridge valves can be formed as one length of material. The diagnostic device 130 shown in FIG. 6 exemplifies an embodiment wherein the solute bridge valves are formed as one extended length of solute bridge valve material 270 in a substrate 134 separate from a substrate 132, within which various regions such as regions 140 and 142 are formed. When the two substrates 132 and 134 are sandwiched together to form the device 130, the length of solute bridge valve material 270 can connect to fluid passageways 260, 262, 264, and 266, as shown in FIG. 7, which fluid passageways can be connected to various regions. As illustrated in FIG. 7, even if the two substrates 132, 134 are not perfectly aligned, the length of solute bridge valve material 270 will still connect with fluid passageways 260, 262, 264, and 266. FIG. 8 illustrates a situation wherein separate substrates for solute bridge valves 370, 372 and fluid passageways 360, 362, 364, and 366, are not perfectly aligned when forming a device as exemplified in the embodiment of FIG. 2. In this situation solute bridge valves 370, 372 would not connect to fluid passageways 360, 362, and 364, 366.

Referring to FIG. 9, and according to some embodiments, regions 444, 446, and 448 can be formed in a substrate 440, with region 444 interconnected with region 448 through a fluid passageway 470, and region 446 interconnected with region 448 through a fluid passageway 472. Solution such as reagents and/or wash buffers can be retained in reservoirs 444 and 446 by a flexible sheet of material 460 applied over the top surface of substrate 440 and adhered to the top surface by an adhesive layer 462. Pressure-actuated valves 470a, 472a can be positioned in fluid passageways 470, 472 such that pressure applied to the solutions in regions 444, 446 by pressing down on the flexible sheet 460 over the respective regions will dispense the solutions through fluid passageways 470, 472 into region 448. Barrier 450 can define an inner reservoir 430 and provide an automatically controlled interaction between the solution or solutions 442 in region 448 and a solution retained in inner region 430. The barrier can be adapted to gradually dissolve and thereby control the interaction between the solution or solutions 442 in outer region 448 and one or more solid and/or liquid components, for example, reagents for reaction, for example a solution retained in inner region 430.

According to some embodiments, and as exemplified by the embodiment shown in FIG. 10, a device can be provided that can comprise a substrate 540 having region 542 formed in the substrate and covered by sheet 560 that is adhered to the top surface of substrate 540 by adhesive 562. An inner reservoir 530 can be defined within region 542 by barrier 550 that can act as a fluid flow modulator between a solution in outer region 542 and a solution or material in inner region 530. Barrier 550 can comprise portion 552 made from a soluble material, and portion 554 made from an insoluble material to provide a further degree of automatic control of the interaction between the solutions or other solid ingredients in regions 542 and 530. Sample and/or reagents can be injected into regions 542 to initiate a process. A septum (not shown) can be provided as an injection port or injection can occur, for example, by piercing a cover layer.

According to some embodiments, and as exemplified in the embodiment shown in FIG. 11, substrate 700 can be provided with region 740 connected through fluid passageway 770 and having a pressure-actuated valve 772 to second region 742. Similarly, another region 740a can be connected through fluid passageway 770a having pressure actuated valve 772a to second region 742. A star-shaped or otherwise polygonal region 730 can be defined inside of second region 742 by barrier 750. All of the regions can be covered by sheet 760 adhered to the top surface of substrate 700 by adhesive layer 762. A solution within region 740 can be dispensed through fluid passageway 770 by applying pressure to sheet 760 over region 740 to force the liquid past pressure-actuated valve 772 into second region 742. Barrier 750 can comprise a material adapted to gradually dissolve or melt in response to a stimulus such as a characteristic or property of a solution that has been introduced into second region 742. The result is an automatically controlled interaction between the solution in second region 742 and the solution in region 730. In an exemplary device, fluid passageways could interconnect with each respective point of the star shape shown. Regions 730 and 742 can also contain the same or different solutions and/or solid ingredients.

According to some embodiments, further control of the fluid handling steps can be provided by including various solute structures within the fluid passageways and/or the regions. The solute structures can be selected to dissolve over a finite amount of time and change the flow properties of the fluidic circuit. As an example, raised structures (such as pillars of different aspect ratios) made from solute material (such as acrylamide) can be fabricated by photolithography inside the various regions, reservoirs, and/or fluid passageways. The incorporation of these structures can cause the fluid passageways to have different capillarity and can cause capillary flow of different magnitudes in different parts of the fluidic circuit. The structures can also introduce additional flow resistance, with a variation in the flow resistance depending on the dissolution of the solute structures.

In one example, an array of pillars made of polyacrylamide could be fabricated inside of waste regions 50, 52, in the embodiment of FIG. 2, or 50a, 52a in the embodiment of FIG. 3, which could, for example, cause greater flow rates in waste region 50 or 50a by capillary action as compared to the flow rates in reaction region 48 or 48a. Over time, the solute structures within waste region 50 or 50a would dissolve in the liquid, which could result in the capillary suction pressure into region 50 or 50a reducing over time. Subsequent dissolution of a solute within flow passageway 176 between waste region 50 and waste region 52, for example, could then result in the liquid in waste region 50 being pulled into waste region 52. The pulling can be as a result of a larger capillary suction pressure in waste region 52 caused by solute structures in region 52. The polyacrylamide cannot operate until 74 and 76 in FIG. 2 and 170a, 172a and 174a in FIG. 3 are open. The flow of 120, 125 and 126 in FIG. 2 into 44, 46, and 48, respectively, relies on capillary effect alone, and does not rely on vacuum created by the polyacrylamide (or any hydrating polymers or water absorbents) in 50 or 52 because neither 76 nor 74 are open. Polyacrylamide can facilitate fluid flow from 48 into 50 and/or 52 without a vent. The flow of 120, 124 or 126 into 44, 46, or 48, respectively, relies on capillary effect that requires air vents to prevent pressure build up.

According to some embodiments, side products in nucleic acid amplification methods can be reduced by using a barrier as described herein, in a fluid processing device. The yield of a desired product in a nucleic acid amplification method can be improved. Many reaction components can be stored together in the same region or same fluid passageway of a device, thus enabling miniaturized designs and packaging. According to some embodiments, the shelf life of reaction components and reactant mixtures can be increased. Furthermore, the barriers, flow modulators, and valves described herein can be incorporated in PCR devices, in the TaqMan product lines available from Applied Biosystems, Foster City, Calif., in microfluidic devices in which isothermal nucleic acid amplification is performed, in the devices described in U.S. patent application Ser. Nos. 10/808,228 and 10/808,229, both of which were filed on Mar. 24, 2004, which are incorporated herein in their entireties by reference, and in the devices described in U.S. Patent Application Publication No. US2004/0132051 A1, to Andersen, entitled "Mg-Mediated Hot Start Biochemical Reactions," published Jul. 8, 2004, which is incorporated herein in its entirety by reference. The barriers, flow modulators, and valves described herein can also be incorporated into portable, handheld microassay devices.

Other embodiments of the present teachings will be apparent to those skilled in the art from consideration of the present specification and practice of the present teachings disclosed herein. It is intended that the present specification and examples be considered as exemplary only.

What is claimed is:
1. A fluid processing device, comprising:
a substrate;
one or more fluid retainment regions in communication with the substrate, comprising at least a first fluid retainment region and a second fluid retainment region;
a first flow passageway in fluid communication with the at least first fluid retainment region and the second fluid retainment region; and
a barrier, arranged in the flow passageway, configured to separate the first fluid retainment region from the second fluid retainment region so that there is no fluid communication between the first fluid retainment region and the second fluid retainment region when the barrier is in an undissolved state, wherein the barrier comprises a solvent dissolvable, LCST-free material, and wherein the barrier is configured to dissolve to establish fluid communication or to increase the rate of fluid communication, between at least the first fluid retainment region and the second fluid retainment region.

2. The fluid processing device of claim 1, wherein the LCST-free material comprises a polymer of at least one or more of an acrylamide monomer, an acrylic ester, a vinyl ether, a N-vinylamide, a vinyl acid, a sodium salt of a vinyl acid, a nitrogen-containing vinyl monomer, a polyamine, a poly(alkylene imine), a poly(silicic acid), a salt of poly(silicic acid), a poly(maleic acid), poly(maleic anhydride-alt-methylvinyl ether), and a combination thereof.

3. The fluid processing device of claim 1 wherein the LCST-free material comprises a polymer of at least one or more acryl amide monomers comprising one or more of (meth)acryloxylmorpholine, (meth)acrylamide, N-hydroxymethyl(meth)acrylamide, N-(2-hydroxyethyl)(meth)acrylamide, N-tris(hydroxymethyl)methyl(meth)acrylamide, N-methyl(meth)acrylamide, N-hydroxymethyl(meth)acrylamide, N-(2-hydroxyethyl)(meth)acrylamide, N-(3-hydroxypropyl)(meth)acrylamide, N,Ndimethyl(meth)acrylamide, (meth)acryloyltris(hydroxymethyl)methylamine, (meth)acryloylurea, and a combination thereof.

4. The fluid processing device of claim 1, wherein the LCST-free material comprises a polymer of at least one or more acrylic esters, the one or more acrylic esters comprising one or more of 2-(acryloyloxy)ethyl succinate, [2-(acryloyloxy)ethyl]trimethylammonium chloride, hydroxymethyl (meth)acrylate, hydroxyethyl (meth)acrylate, and a combination thereof.

5. The fluid processing device of claim 1, wherein the LCST-free material comprises at least one polymer derived from at least one or more vinyl ethers comprising one or more of vinyl methyl ether, ethylene glycol vinyl ether, and a combination thereof.

6. The fluid processing device of claim 1, wherein the LCST-free material comprises at least one polymer prepared with at least one or more N-vinylamides comprising one or more of N-vinylformaide, N-methyl-N-vinylformaide, N-vinylacetamide, N-methyl-Nvinylacetamide, and a combination thereof.

7. The fluid processing device of claim 1, wherein the LCST-free material comprises at least one polymer prepared with at least one or more vinyl acids comprising acrylic acid, 3-acryyloyloxypropane-1-sulfonic acid, vinylphosphonic acid, vinylsulfonic acid, styrene sulfonic acid, 4-vinylbenzoic acid, N-vinylsuccinamidic acid, and a combination thereof.

8. The fluid processing device of claim 1, wherein the LCST-free material comprises at least one polymer prepared with at least one or more vinyl monomers comprising one or more of 1-vinyl-2-pyrrolidinone, 3-vinyloxazilidine-2-one, 5-methyl-3-vinyloxazolidine-2-one, 4-vinylpyridine, an N-substituted derivative of 4-vinylpyridine, 2-vinylpiperidine, 4vinylpiperdidine, and a combination thereof.

9. The fluid processing device of claim 1, wherein the LCST-free material comprises at least one polymer prepared with at least one or more polyamines comprising one or more of poly(vinylamine), poly(allylamine), and a combination thereof.

10. The fluid processing device of claim 1, wherein the LCST-free material comprises at least one polymer comprising at least one or more of a linear poly(alkylene imine), a branched poly(alkylene imine), and a combination thereof.

11. The fluid processing device of claim 10, wherein the poly(alkylene imine) comprises a polymer of at least one or more of poly(ethylene imine), poly(2-methyl-2-oxazoline), poly(2-ethyl-2-oxazoline), and a combination thereof.

12. The fluid processing device of claim 1, wherein the barrier comprises a water-soluble barrier.

13. The fluid processing device of claim 1, further comprising:
- a first reaction component, retained in the first fluid retainment region; and
- a second reaction component retained in the second fluid retainment region, wherein the second reaction component differs from the first reaction component.

14. The fluid processing device of claim 1, further comprising:
- a third fluid retainment region;
- a second flow passageway; and
- at least one actuatable valve arranged in the second flow passageway, wherein the at least one flow passageway is in fluid communication with the third fluid retainment region and with at least one of the plurality of fluid retainment regions.

15. The fluid processing device of claim 14, wherein the at least one actuatable valve comprises a pressure-actuatable valve or a heat-actuatable valve.

16. The fluid processing device of claim 15, wherein the at least one actuatable valve comprises a pressure-actuatable valve comprising a frangible diaphragm.

17. The fluid processing device of claim 15, wherein the at least one actuatable valve comprises—a heat-actuatable—valve comprising one or more of a rubber, a plastic, a wax, a paraffin, a polyethylene glycol material, a derivative of polyethylene glycol, a polysaccharide, and a combination thereof.

18. The fluid processing device of claim 1, wherein the barrier comprises a fluid flow modulator.

19. The fluid processing device of claim 18, wherein the first flow passageway is dimensioned to be effective to achieve flow of a fluid by capillary action, from at least one of the at least two fluid retainment regions through the flow passageway.

20. The fluid processing device of claim 18, wherein the first flow passageway is dimensioned to be effective to achieve a migration of charged components by electrokinetic action, from at least one of the at least two fluid retainment regions through the first flow passageway.

21. The fluid processing device of claim 1, wherein the barrier comprises a series of fluid flow modulators arranged in sequence in the first flow passageway and adapted to open sequentially, to establish fluid communication or to increase the rate of fluid communication, between the at least two fluid retainment regions.

* * * * *